United States Patent
Czanta et al.

(10) Patent No.: US 8,231,806 B2
(45) Date of Patent: Jul. 31, 2012

(54) LIQUID-CRYSTALLINE MEDIUM AND LIQUID-CRYSTAL DISPLAY

(75) Inventors: Markus Czanta, Darmstadt (DE); Michael Wittek, Darmstadt (DE); Lars Lietzau, Darmstadt (DE); Marcus Reuter, Darmstadt (DE); Brigitte Schuler, Grossotheim (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 0 days.

(21) Appl. No.: 12/921,895

(22) PCT Filed: Feb. 25, 2009

(86) PCT No.: PCT/EP2009/001333
§ 371 (c)(1),
(2), (4) Date: Sep. 10, 2010

(87) PCT Pub. No.: WO2009/112153
PCT Pub. Date: Sep. 17, 2009

(65) Prior Publication Data
US 2011/0024682 A1    Feb. 3, 2011

(30) Foreign Application Priority Data
Mar. 11, 2008 (DE) .......... 10 2008 013 633

(51) Int. Cl.
C09K 19/00 (2006.01)
C09K 19/06 (2006.01)
C09K 19/52 (2006.01)

(52) U.S. Cl. ........... 252/299.6; 252/299.01; 252/299.61; 252/299.62; 252/299.63; 252/299.64; 252/299.65; 430/20; 428/1.1; 349/1; 349/56; 349/182

(58) Field of Classification Search .................. None
See application file for complete search history.

(56) References Cited

U.S. PATENT DOCUMENTS
7,767,277 B2 * 8/2010 Lietzau et al. ................ 428/1.1
2006/0278850 A1  12/2006 Czanta et al.
2008/0132716 A1   6/2008 Lietzau et al.

FOREIGN PATENT DOCUMENTS
DE 102007038618 A1 3/2008
EP    1835010 A1     9/2007
EP    1900792 A1     3/2008

OTHER PUBLICATIONS

World Intellectual Property Organization. "Search Report." PCT/EP2009/001333. Applicant: Merck Patent GMBH. Mailed Jun. 8, 2009.
Espacenet Database: "English Abstract-Liquid crystalline medium and liquid crystal display." EP1835010A1. Applicant: Merck Patent GMBH; Sep. 19, 2007.

* cited by examiner

*Primary Examiner* — Geraldina Visconti
(74) *Attorney, Agent, or Firm* — Millen, White, Zelano & Branigan, P.C.

(57) ABSTRACT

The present invention relates to dielectrically positive liquid-crystalline media comprising in each case one or more compounds of the formula I

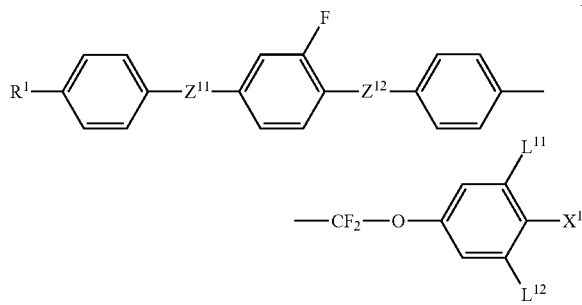

in which the parameters have the respective meanings indicated in the specification, and optionally one or more further dielectrically positive compounds and optionally one or more further dielectrically neutral compounds, and to liquid-crystal displays containing these media, especially to active-matrix displays and in particular to TN, IPS and FFS displays.

19 Claims, No Drawings

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that utilise an electric field which is substantially parallel to the substrates or the liquid-crystal layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desk-top monitors and are intended for use in displays for TV sets and multi-media applications. The liquid crystals according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. In particular for monitor applications, the rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$), and the dielectric anisotropy ($\Delta \varepsilon$) should be sufficiently high to allow a leasonably low operating voltage. $\Delta \varepsilon$ should preferably be greater than 2 and very preferably greater than 3, but preferably not greater than 15 and in particular not greater than 12, as this would prevent an at least fairly high resistivity.

For applications as displays for notebooks or other mobile applications, the rotational viscosity should preferably be 120 mPa·s or less and particularly preferably 100 mPa·s or less. The dielectric anisotropy ($\Delta \varepsilon$) here should preferably be greater than 8 and particularly preferably greater than 12.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes according to the present invention preferably use an electric field which is substantially parallel to the composite layer.

Compounds of the formula

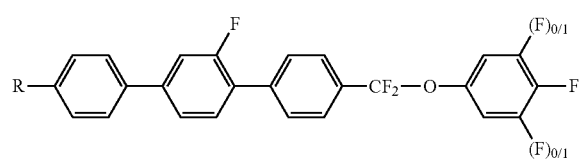

in which R denotes H, alkyl or alkenyl, are, besides others, mentioned in DE 10 2007 038 618 A1.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long addressing times, have inadequate values of the resistivity and/or require excessively high operating voltages. In addition, there is a demand for improving the low-temperature behaviour of LCDs. Both an improvement in the operating properties and also in the shelf life are necessary here.

Thus, there is a considerable need for liquid-crystalline media having suitable properties for practical applications, such as a broad nematic phase range, suitable optical anisotropy $\Delta n$ corresponding to the display type used, a high $\Delta \varepsilon$ and particularly low viscosities for particularly short response times.

Present Invention

Surprisingly, it has now been found that it is possible to achieve liquid-crystalline media having a suitably high $\Delta \varepsilon$, a suitable phase range and $\Delta n$ which do not exhibit the disadvantages of the materials from the prior art, or at least only do so to a significantly lesser extent.

These improved liquid-crystalline media according to the present invention comprise
one or more compounds of the formula I

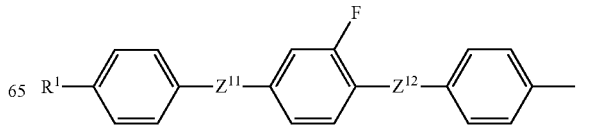

-continued

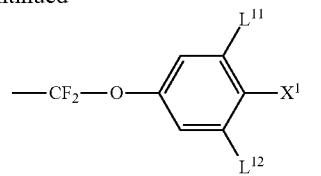

in which
R¹ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C. atoms and preferably alkyl or alkenyl,
$Z^{11}$ and $Z^{12}$, independently of one another, denote —CH₂CH₂—, —CF₂CF₂—, —COO—, trans-CH=CH—, trans-CF=CF—, —CH₂O—, —CF₂O— or a single bond, preferably —CH₂CH₂—, —COO—, trans-CH=CH— or a single bond, particularly preferably —CF₂O— or a single bond and very preferably a single bond,
$L^{11}$ and $L^{12}$, independently of one another, denote H, F or Cl, preferably H or F, preferably one or both and particularly preferably both denote F, and
$X^1$ denotes F, Cl, —CFH₂, —CF₂H, —CF₃, —OCF₂H or —OCF₃, preferably F, and
optionally one or more compounds selected from the group of the compounds of the formulae II and III:

II

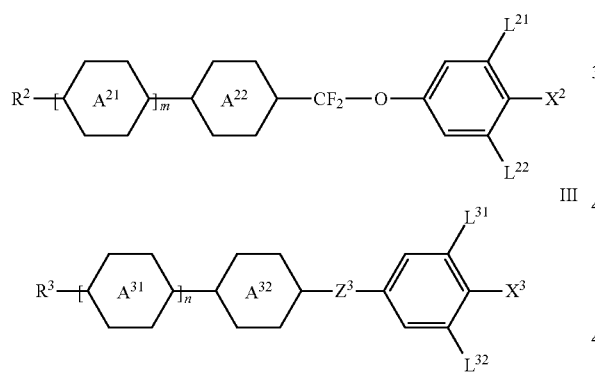

III in which
R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and R² and R³ preferably denote alkyl or alkenyl,

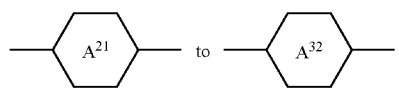

on each appearance, independently of one another, denote

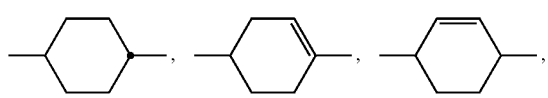

-continued

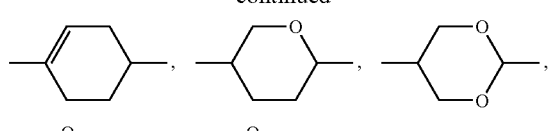

preferably

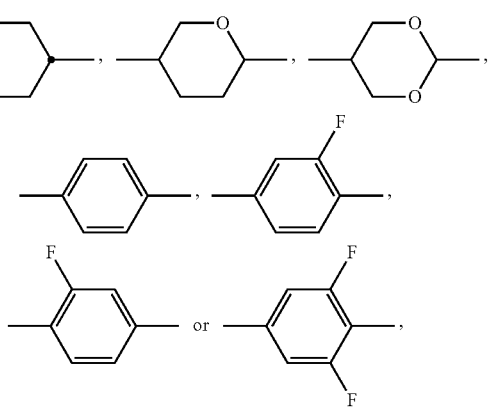

$L^{21}, L^{22}, L^{31}$ and $L^{32}$, independently of one another, denote H or F, $L^{21}$ and/or $L^{31}$ preferably denote F, X² and X³, independently of one another, denote halogen, halogenated alkyl or alkoxy having 1 to 3 C atoms or halogenated alkenyl or alkenyloxy having 2 or 3 C atoms, preferably F, Cl, —OCF₃ or —CF₃, very preferably F, Cl or —OCF₃, Z³ denotes —CH₂CH₂—, —CF₂CF₂—, —COO—, trans-CH=CH—, trans-CF=CF—, —CH₂O— or a single bond, preferably —CH₂CH₂—, —COO—, trans-CH=CH— or a single bond and very preferably —COO—, trans-CH=CH— or a single bond, and m and n, independently of one another, denote 0, 1, 2 or 3, m preferably denotes 1, 2 or 3, and n preferably denotes 0, 1 or 2 and particularly preferably 1 or 2, where, in the case of formula II, compounds of the formula I are excluded, and optionally one or more compounds of the formula IV

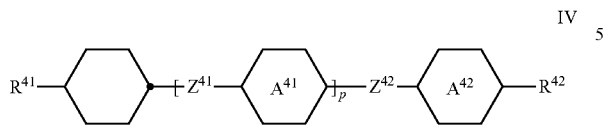

in which $R^{41}$ and $R^{42}$, independently of one another, have the meaning indicated for $R^2$ above under formula II, preferably $R^{41}$ denotes alkyl and $R^{42}$ denotes alkyl or alkoxy or $R^{41}$ denotes alkenyl and $R^{42}$ denotes alkyl,

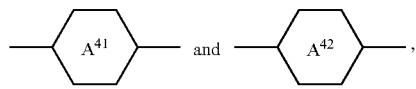

independently of one another and, if

occurs twice, also these independently of one another, denote

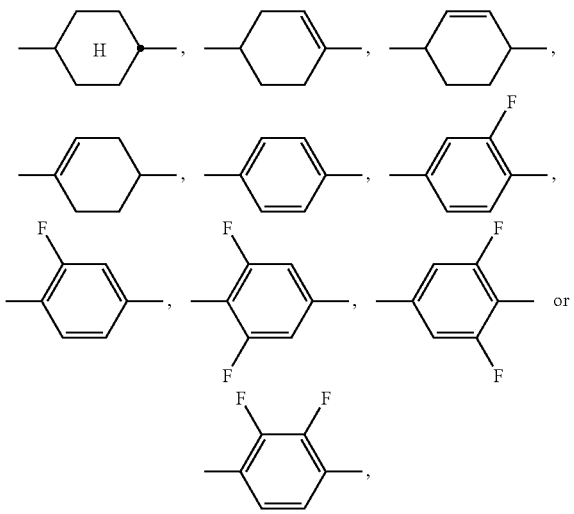

preferably one or more of

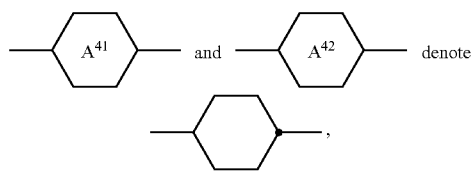

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote a single bond, and p denotes 0, 1 or 2, preferably 0 or 1.

The compounds of the formulae I, II and III are preferably dielectrically positive compounds, preferably having a dielectric anisotropy of greater than 3.

The compounds of the formula IV are preferably dielectrically neutral compounds, preferably having a dielectric anisotropy in the range from −1.5 to 3.

The liquid-crystalline media according to the present application preferably comprise in total 1 to 50%, preferably 1 to 30%, of compounds of the formula I.

The individual compounds of the formula I and optionally the compounds of the formulae II and/or III are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, concentration can be in the range from 2 to 20%, preferably from 3 to 14%.

In a preferred embodiment of the present invention, the media according to the invention in each case comprise one or more compounds of the formula I selected from the group of the compounds of the formulae I-1 to I-3, preferably of the formula I-3:

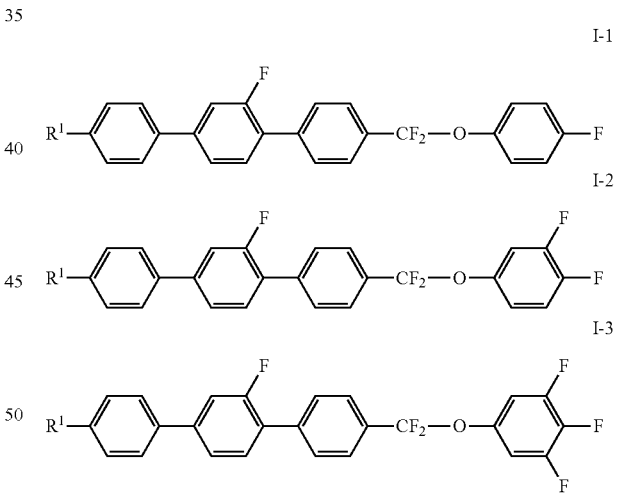

in which $R^1$ has the meaning indicated above under formula I.

In addition to the compounds selected from the group of the compounds of the formula I, or preferred sub-formulae thereof, the media according to the present invention preferably comprise one or more dielectrically positive compounds having a dielectric anisotropy of greater than 3, selected from the group of the formulae II and III.

In a preferred embodiment of the present invention, the media according to the invention comprise one or more compounds selected from the group of the compounds of the formulae II-1 to II-4, preferably of the formulae II-1 and/or II-2:

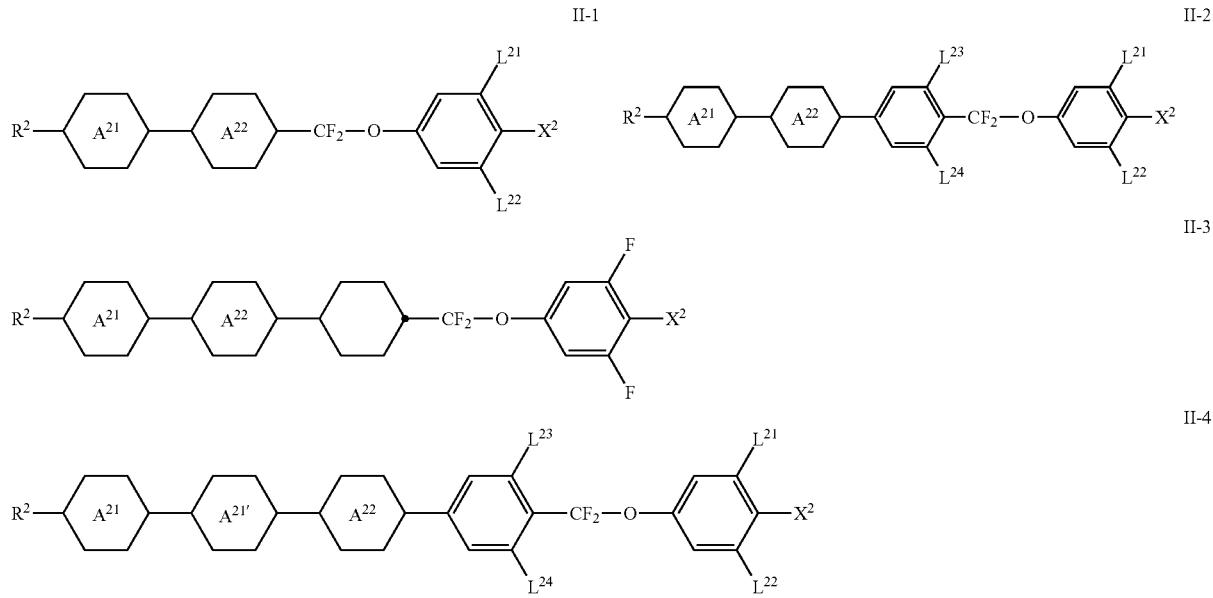

in which the parameters have the respective meanings indicated above under formula II, and $L^{23}$ and $L^{24}$, independently of one another, denote H or F, preferably $L^{23}$ denotes F, and

has one of the meanings given for

and, in the case of the formulae II-1 and II-4, $X^2$ preferably denotes F or $OCF_3$, particularly preferably F, and, in the case of the formula II-3,

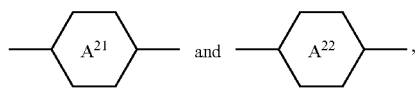

independently of one another, preferably denote

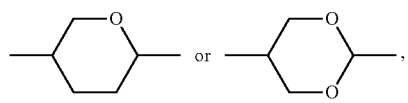

where the compounds of the formula I are excluded, and/or selected from the group of the compounds of the formulae III-1 and III-2:

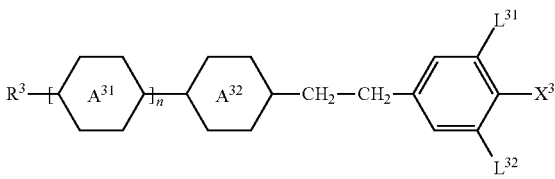

in which the parameters have the meaning given under formula III.

In a preferred embodiment, the media according to the present invention alternatively or in addition to the compounds of the formulae III-1 and/or III-2 comprise one or more compounds of the formula III-3

III-3 in which the parameters have the respective meanings indicated above, and the parameters $L^{31}$ and $L^{32}$, independently of one another and of the other parameters, denote H or F.

The media according to the invention preferably comprise one or more compounds selected from the group of the compounds of the formulae II-1 to II-4 in which $L^{21}$ and $L^{22}$ and/or $L^{23}$ and $L^{24}$ both denote F.

In a preferred embodiment, the media comprise one or more compounds which are selected from the group of the compounds of the formulae II-2 and II-4 in which $L^{21}$, $L^{22}$, $L^{23}$ and $L^{24}$ all denote F.

The media preferably comprise one or more compounds of the formula II-1. The compounds of the formula II-1 are preferably selected from the group of the compounds of the formulae II-1a to II-1e:

II-1a
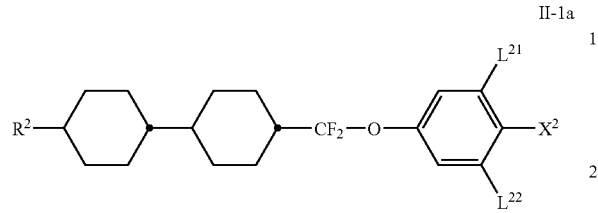

II-1b
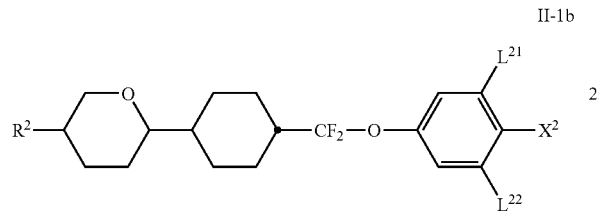

II-1c
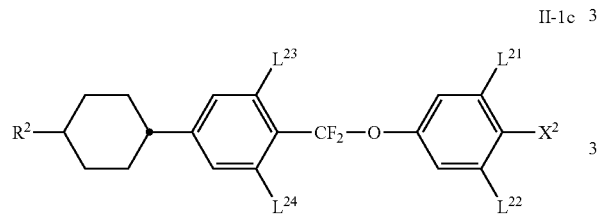

II-1d
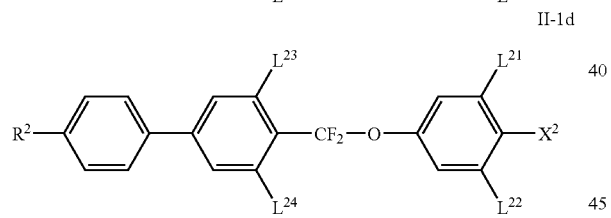

II-1e
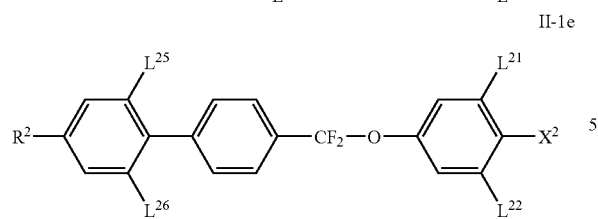

in which the parameters have the respective meanings indicated above, and $L^{23}$ to $L^{26}$, independently of one another and of the other parameters, denote H or F, and preferably in formulae II-1a and II-1b $L^{21}$ and $L^{22}$ both denote F, in formulae II-1c and II-1d $L^{21}$ and $L^{22}$ both denote F and/or $L^{23}$ and $L^{24}$ both denote F, and in formula II-1e $L^{21}$, $L^{22}$ and $L^{25}$ denote F, and in each case the other parameters have the respective meanings given above.

Especially preferred compounds of the formula II-1 are

II-1a-1
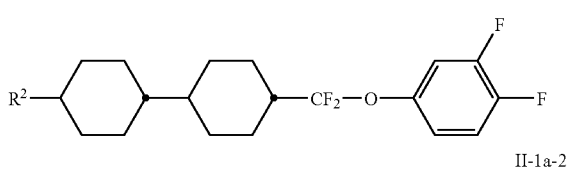

II-1a-2
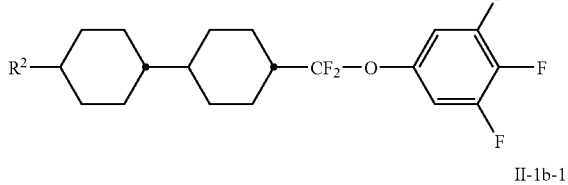

II-1b-1
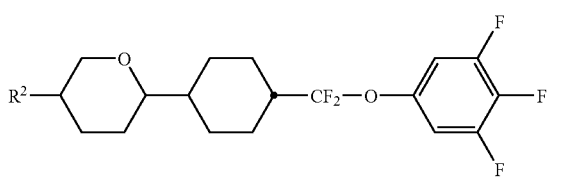

II-1d-1
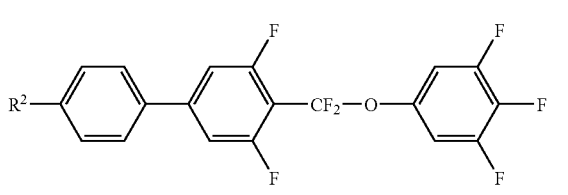

II-1e-2
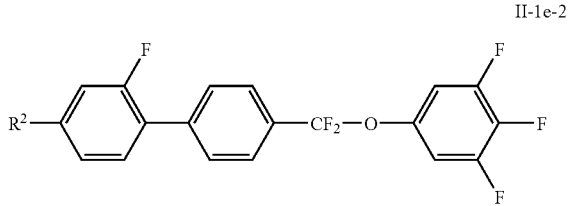

in which $R^2$ has the meaning indicated above.

The media preferably comprise one or more compounds of the formula II-2, which are preferably selected from the group of the compounds of the formulae II-2a to II-2j:

II-2a
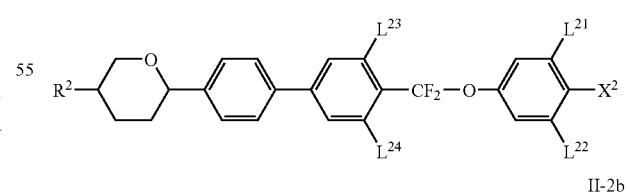

II-2b
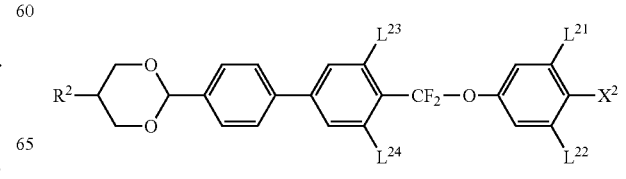

-continued

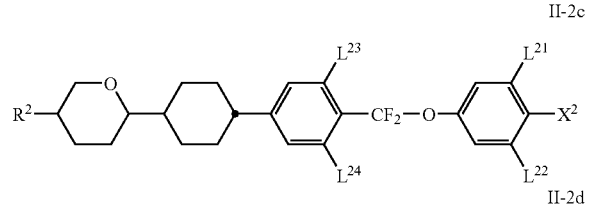
II-2c

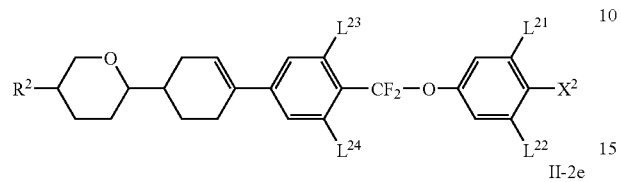
II-2d

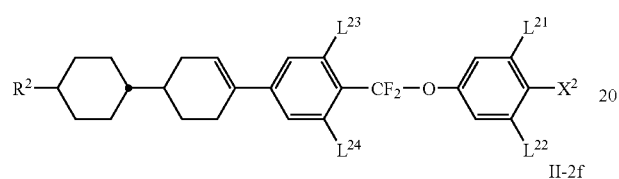
II-2e

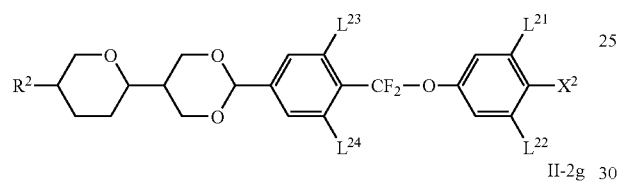
II-2f

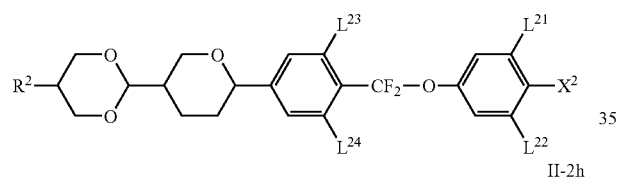
II-2g

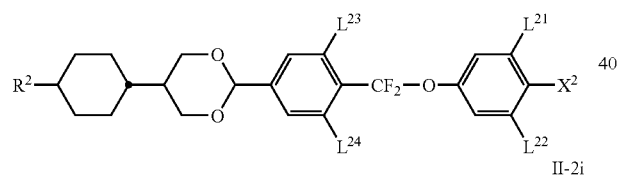
II-2h

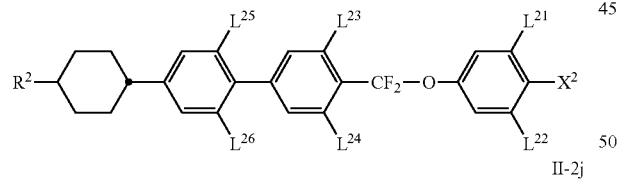
II-2i

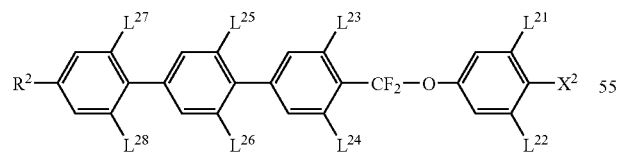
II-2j in which the parameters have the respective meanings indicated above, and $L^{25}$ to $L^{28}$, independently of one another, denote H or F, preferably $L^{27}$ and $L^{28}$ both denote H, particularly preferably $L^{28}$ denotes H, and the other parameters have the respective meanings given above, and where the compounds of the formula I are excluded.

The media according to the invention preferably comprise one or more compounds selected from the group of the compounds of the formulae II-2a to II-2j in which $L^{21}$ and $L^{22}$ both denote F and/or $L^{23}$ and $L^{24}$ both denote F and the other parameters have the respective meanings given above.

In a preferred embodiment, the media according to the invention comprise one or more compounds selected from the group of the compounds of the formulae II-2a to II-2j in which $L^{21}$, $L^{22}$, $L^{23}$ and $L^{24}$ all denote F and the other parameters have the respective meanings given above.

Especially preferred compounds of the formula II-2 are the compounds of the following formulae:

II-2a-1

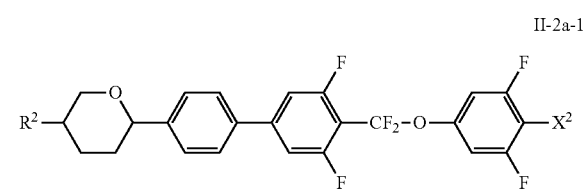

II-2c-1

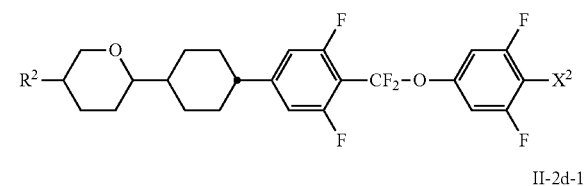

II-2d-1

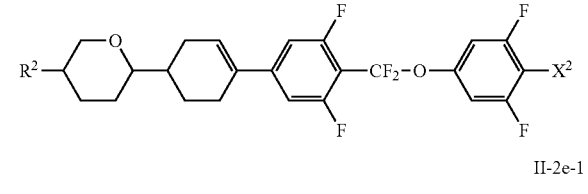

II-2e-1

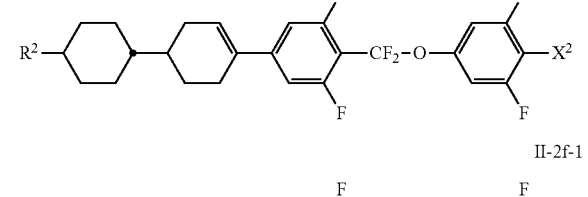

II-2f-1

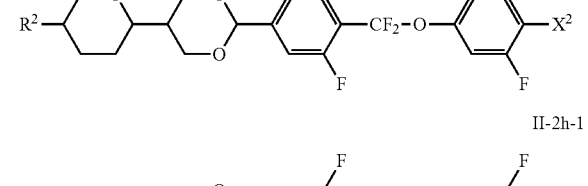

II-2h-1

II-2i-1

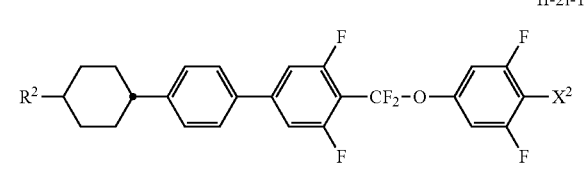

-continued

II-2i-2

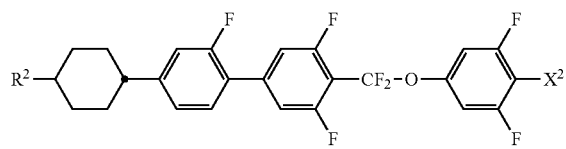

II-2j-1

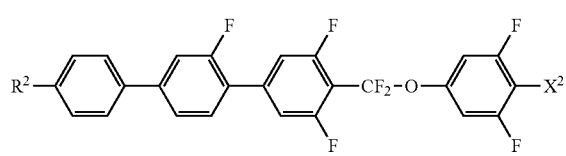

-continued

II-2j-2

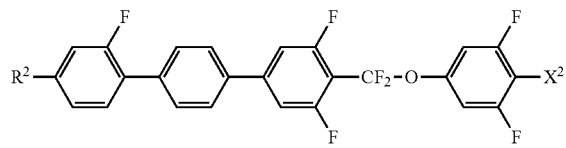

in which $R^2$ and $X^2$ have the meanings indicated above, and $X^2$ preferably denotes F.

The media according to the invention preferably comprise one or more compounds of the formula II-3, preferably selected from the group of the compounds of the formulae II-3a to II-3c:

II-3a

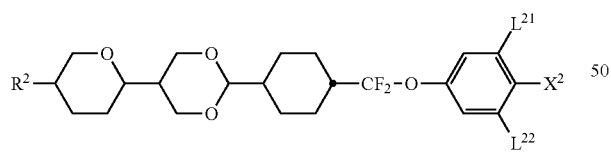

II-3b

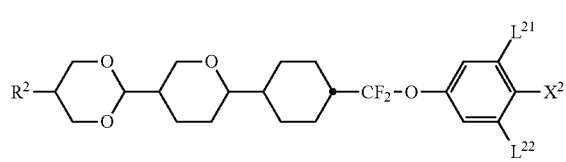

-continued

II-3c

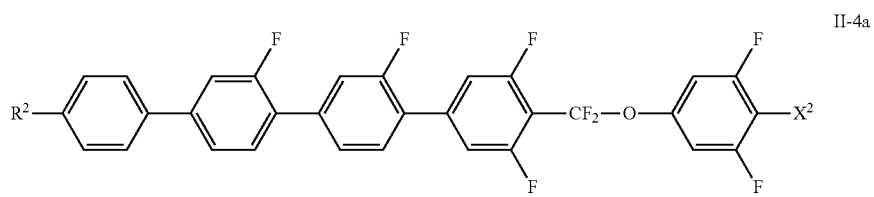

in which the parameters have the respective meanings indicated above, and $L^{21}$ and $L^{22}$ preferably both denote F.

In a preferred embodiment, the media according to the invention comprise one or more compounds of the formula II-4, preferably of the formula II-4-a, II-4a

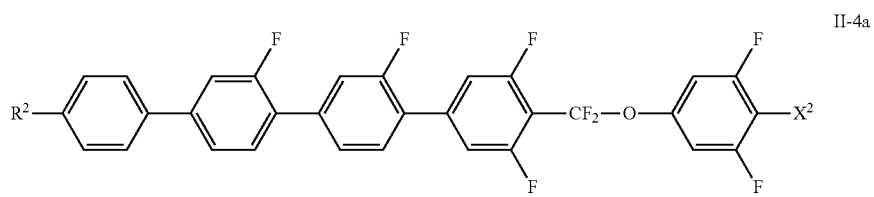

in which the parameters have the meaning given above, and $X^2$ preferably denotes F or $OCF_3$, particularly preferably F.

The media according to the invention preferably comprise one or more compounds of the formula III-1, preferably selected from the group of the compounds of the formulae III-1a and III-1b:

III-1a

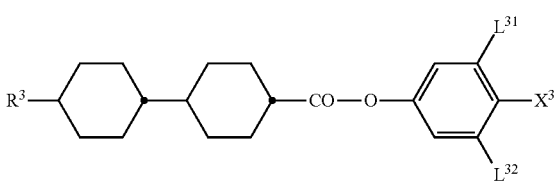

III-1b

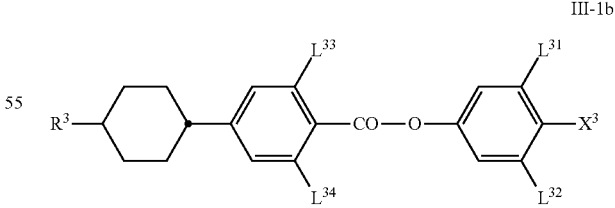

in which the parameters have the respective meanings indicated above, and the parameters $L^{33}$ and $L^{34}$, independently of one another and of the other parameters, denote H or F.

The media according to the invention preferably comprise one or more compounds of the formula III-1a, preferably selected from the group of the compounds of the formulae III-1a-1 to III-1a-6:

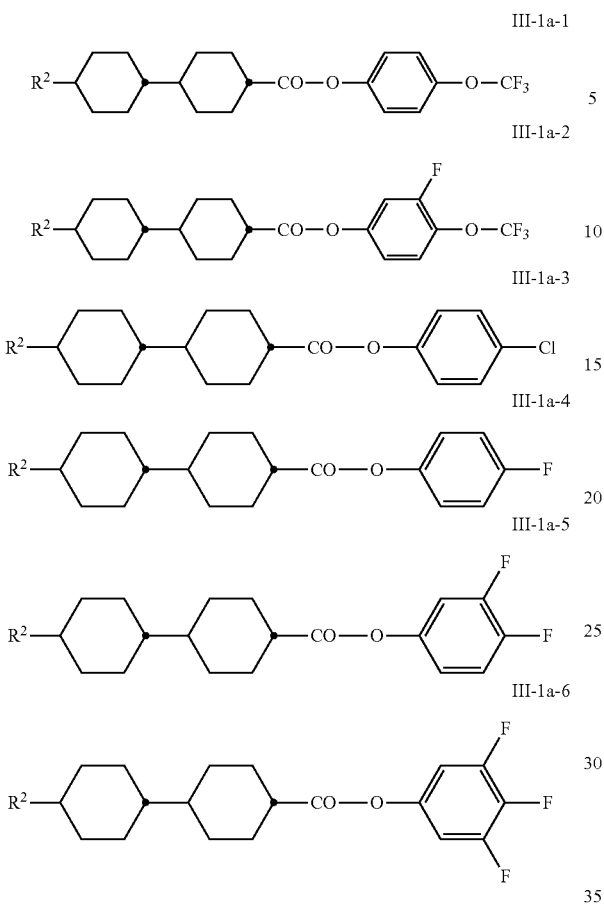

in which R has the meaning indicated above.

The media according to the invention preferably comprise one or more compounds of the formula III-1b, preferably selected from the group of the compounds of the formulae III-1 b-1 to III-1 b-4, preferably of the formula III-1b-4:

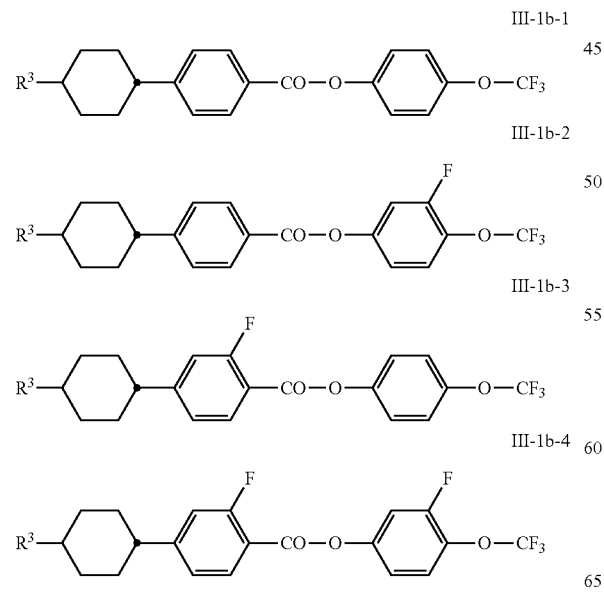

in which $R^3$ has the meaning indicated above.

The media according to the invention preferably comprise one or more compounds of the formula III-2, preferably selected from the group of the compounds of the formulae III-2a to III-2j:

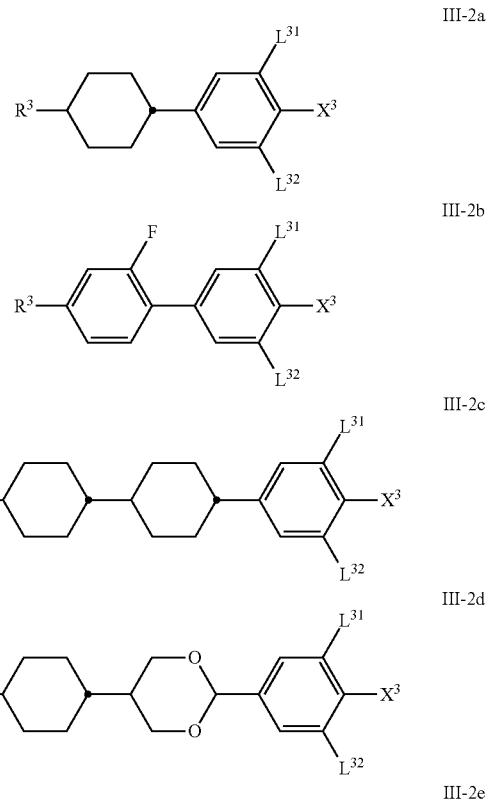

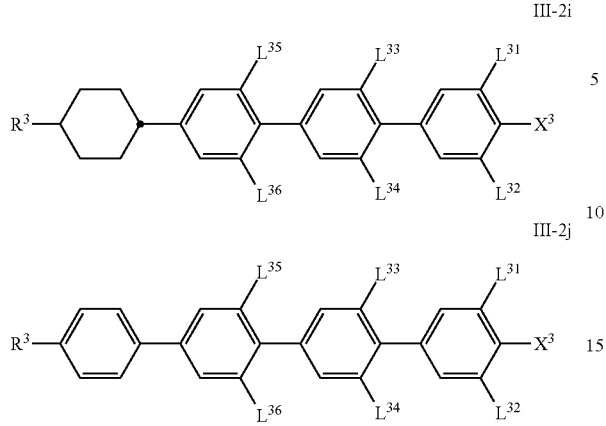

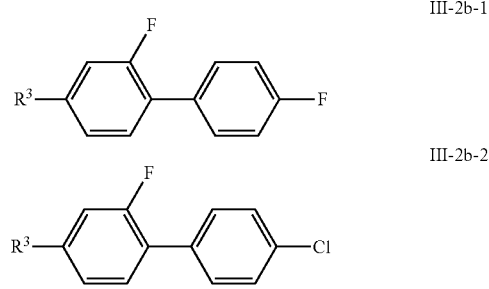

in which R³ has the meaning indicated above.

in which the parameters have the meaning given above and preferably in which the parameters have the respective meanings indicated above, and the parameters $L^{33}$, $L^{34}$, $L^{35}$ and $L^{36}$, independently of one another and of the other parameters, denote H or F.

The media according to the invention preferably comprise one or more compounds of the formula III-2a, preferably selected from the group of the compounds of the formulae III-2a-1 to III-2a-5:

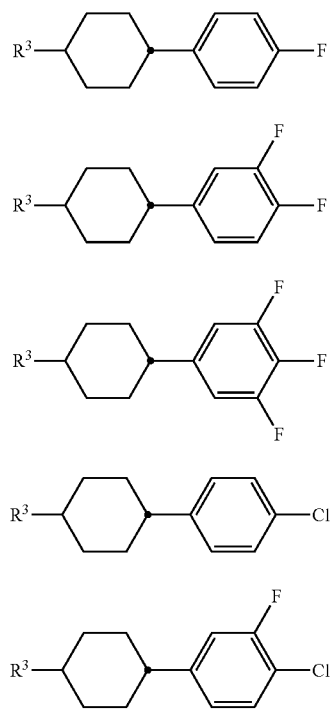

in which R³ has the meaning indicated above.

The media according to the invention preferably comprise one or more compounds of the formula III-2b, preferably selected from the group of the compounds of the formulae III-2b-1 and III-2b-2, preferably of the formula III-2b-2:

The media according to the invention preferably comprise one or more compounds of the formula III-2c, preferably selected from the group of the compounds of the formulae III-2c-1 to III-2c-5:

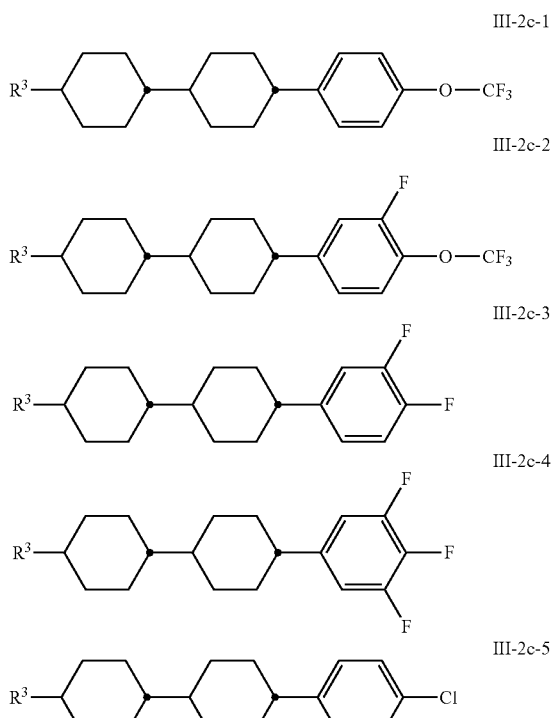

in which R³ has the meaning indicated above.

The media according to the invention preferably comprise one or more compounds selected from the group of the compounds of the formulae III-2d and III-2e, preferably selected from the group of the compounds of the formulae III-2d-1 and III-2e-1:

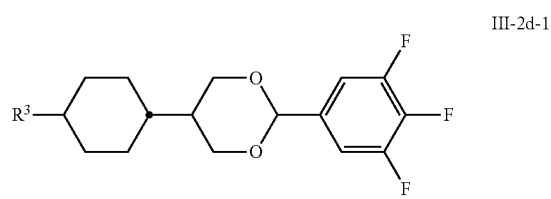

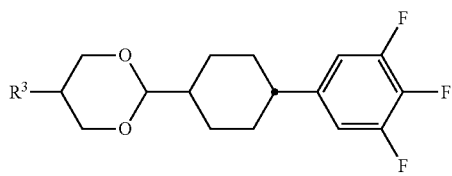
III-2e-1 in which R³ has the meaning indicated above.

The media according to the invention preferably comprise one or more compounds of the formula III-2f, preferably selected from the group of the compounds of the formulae III-2f-1 to III-2f-5:

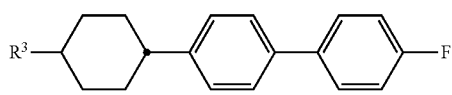
III-2f-1

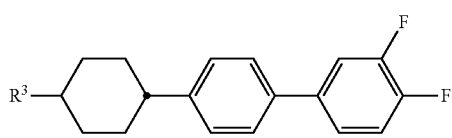
III-2f-2

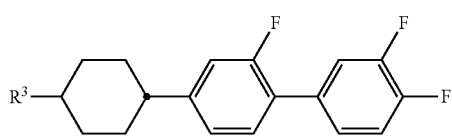
III-2f-3

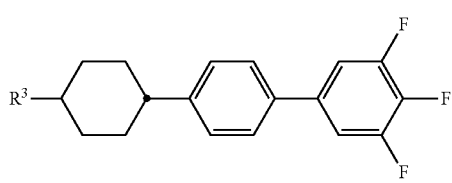
III-2f-4

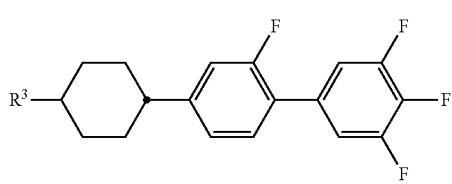
III-2f-5 in which R³ has the meaning indicated above.

The media according to the invention preferably comprise one or more compounds of the formula III-2g, preferably selected from the group of the compounds of the formulae III-2g-1 to III-2g-5:

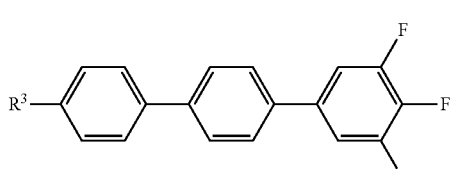
III-2g-1

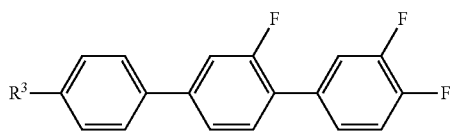
III-2g-2

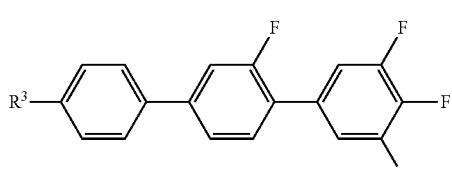
III-2g-3

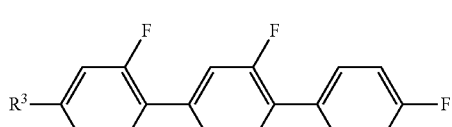
III-2g-4

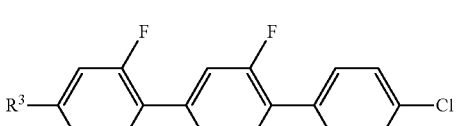
III-2g-5 in which R³ has the meaning indicated above.

The media according to the invention preferably comprise one or more compounds of the formula III-2h, preferably selected from the group of the compounds of the formulae III-2h-1 to III-2h-3, preferably of the formula III-2h-3:

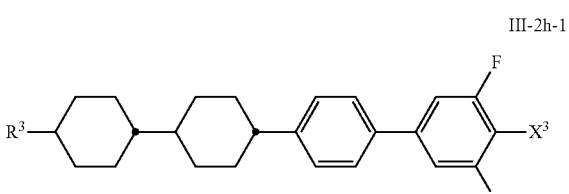
III-2h-1

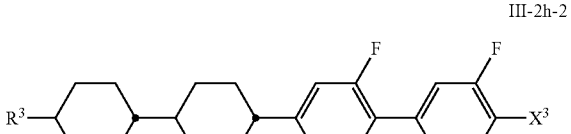
III-2h-2

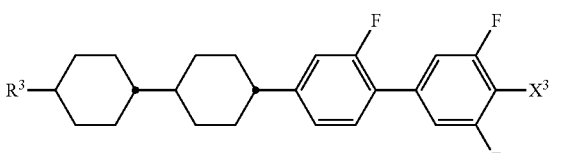
III-2h-3 in which the parameters have the meaning given above, and X³ preferably denotes F.

The media according to the invention preferably comprise one or more compounds of the formula III-2i, preferably selected from the group of the compounds of the formulae III-2i-1 and III-2i-2, preferably of the formula III-2i-2:

III-2i-1

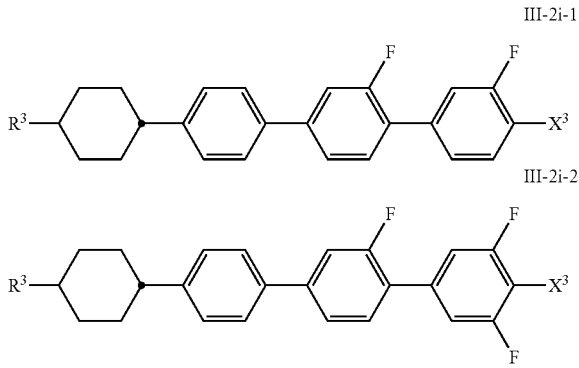

III-2i-2 in which the parameters have the meaning given above, and $X^3$ preferably denotes F.

The media according to the invention preferably comprise one or more compounds of the formula III-2j, preferably selected from the group of the compounds of the formulae III-2j-1 and III-2j-2, preferably of the formula III-2j-1:

III-2j-1

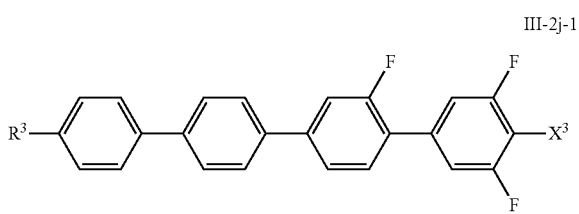

III-2j-2

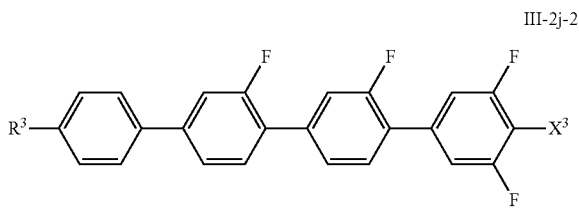

in which the parameters have the meaning given above.

Alternatively or in addition to the compounds of the formulae III-1 and/or III-2, the media according to the present invention may comprise one or more compounds of the formula III-3

III-3

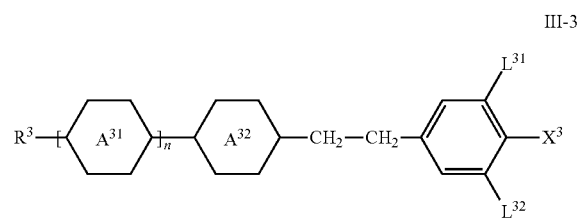

in which the parameters have the respective meanings indicated above under formula III.

These compounds are preferably selected from the group of the formulae III-3a and III-3b:

III-3a

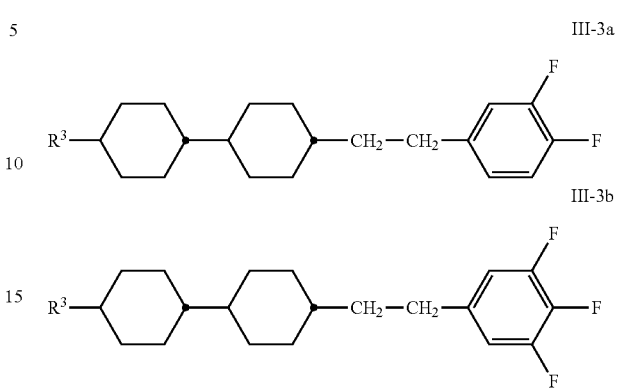

III-3b in which $R^3$ has the meaning indicated above.

The liquid-crystalline media according to the present invention preferably comprise a dielectrically neutral component, component C. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises, more preferably predominantly consists of, even more preferably essentially consists of and very preferably entirely consists of one or more dielectrically neutral compounds of the formula IV having a dielectric anisotropy in the range from −1.5 to 3.

The dielectrically neutral component, component C, preferably comprises one or more compounds selected from the group of the compounds of the formulae IV-1 to IV-6:

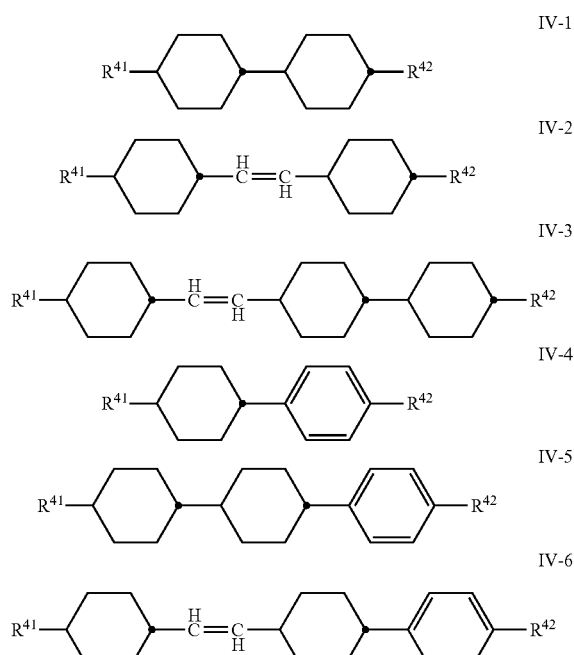

in which $R^{41}$ and $R^{42}$ have the respective meanings indicated above under formula IV, and in formulae IV-1, IV-5 and IV-6

$R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component C, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably one or more compounds of each of the formulae IV-1, IV-4 and IV-5 and very preferably one or more compounds of each of the formulae IV-1, IV-4, IV-5 and IV-6.

In a preferred embodiment, the media according to the invention comprise one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, the media according to the invention comprise one or more compounds of the formula IV-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise component C which comprises, preferably predominantly consists of and very preferably entirely consists of compounds of the formula IV selected from the group of the compounds of the formulae IV-1 to IV-6 as shown above and optionally of the formulae IV-7 to IV-13:

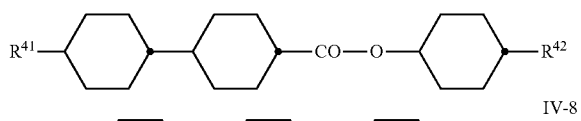

IV-7

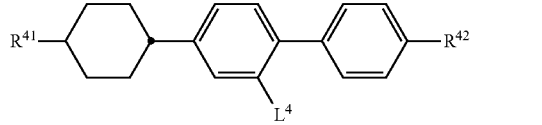

IV-8

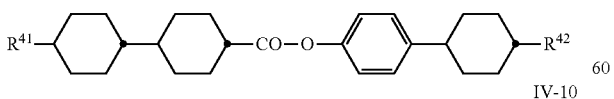

IV-9

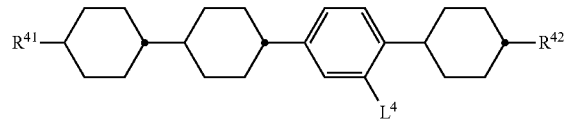

IV-10

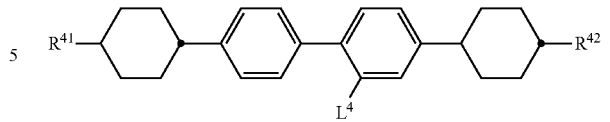

IV-11

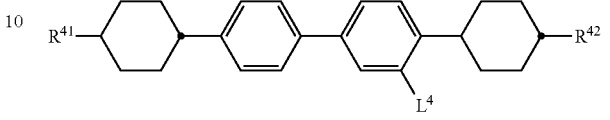

IV-12

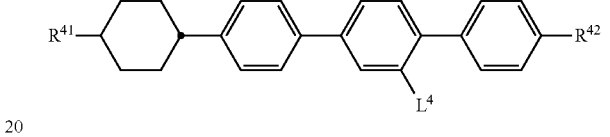

IV-13 in which
$R^{41}$ and $R^{42}$, independently of one another, denote alkyl, alkoxy, fluorinated alkyl or fluorinated alkoky having 1 to 7 C atoms, alkenyl, alkenyloxy, alkoxyalkyl or fluorinated alkenyl having 2 to 7 C atoms, and
$L^4$ denotes H or F.

In a preferred embodiment, the media according to the invention comprise one or more compounds of the formula IV-8, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

The liquid-crystalline media according to the present invention preferably comprise one or more compounds of the formula V

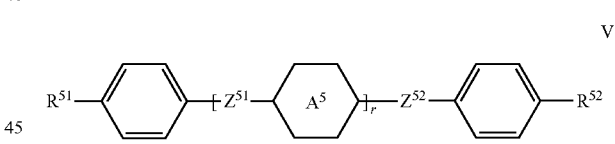

V in which
$R^{51}$ and $R^{52}$, independently of one another, have the meaning indicated for $R^2$ above under formula II, preferably $R^{51}$ denotes alkyl and $R^{52}$ denotes alkyl or alkenyl,

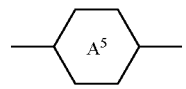

and, if it occurs twice, independently of one another on each occurrence, denotes

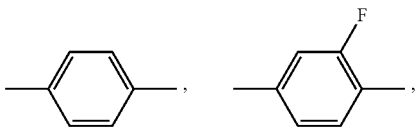

-continued

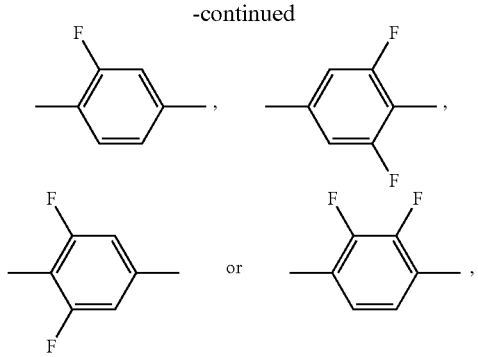

preferably one or more of

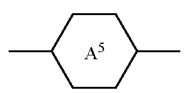

denote

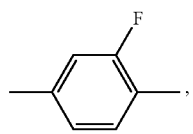

$Z^{51}$ and $Z^{52}$, independently of one another and, if $Z^{51}$ occurs twice, also these independently of one another, denote —CH$_2$CH$_2$—, —COO—, trans-CF=CF—, —CH$_2$O—, —CF$_2$O— or a single bond, preferably one or more of them denote(s) a single bond, and r denotes 0, 1 or 2, preferably 0 or 1, particularly preferably 1.

The compounds of the formula V are preferably dielectrically neutral compounds having a dielectric anisotropy in the range from −1.5 to 3.

The media according to the invention preferably comprise one or more compounds selected from the group of the compounds of the formulae V-1 and V-2:

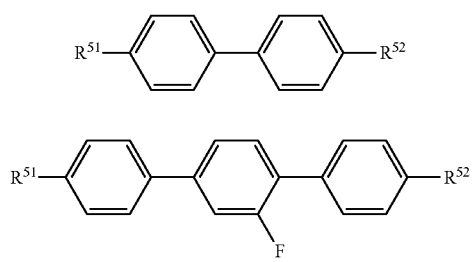

in which $R^{51}$ and $R^{52}$ have the respective meanings indicated above under formula V, and $R^{51}$ preferably denotes alkyl, and in formula V-1 $R^{52}$ preferably denotes alkenyl, preferably —(CH$_2$)$_2$—CH=CH—CH$_3$, and in formula V-2 $R^{52}$ preferably denotes alkyl or alkenyl, preferably —(CH$_2$)$_2$—CH=CH$_2$ or —(CH$_2$)$_2$—CH=CH—CH$_3$.

The media according to the invention preferably comprise one or more compounds selected from the group of the compounds of the formulae V-1 and V-2 in which $R^{51}$ preferably denotes n-alkyl, and in formula V-1 $R^{52}$ preferably denotes alkenyl, and in formula V-2 $R^{52}$ preferably denotes n-alkyl.

In a preferred embodiment, the media according to the invention comprise one or more compounds of the formula V-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, the media according to the invention comprise one or more compounds of the formula V-2, more preferably of the sub-formulae POP-n-m, PGP-n-2V and PGP-n-2Vm thereof, even more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

Alternatively or in addition to the compounds of the formulae II and/or III, the media according to the present invention may comprise one or more dielectrically positive compounds of the formula VI

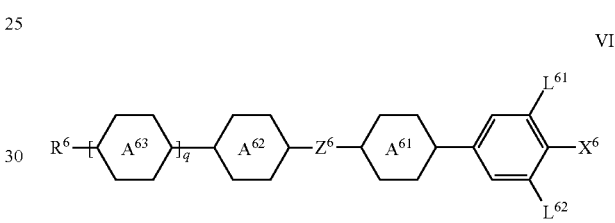

in which $R^6$ denotes alkyl, alkoxy, fluorinated alkyl or fluorinated alkoxy having 1 to 7 C atoms; alkenyl, alkenyloxy, alkoxyalkyl or fluorinated alkenyl having 2 to 7 C atoms and preferably alkyl or alkenyl,

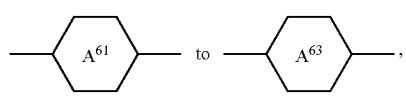

independently of one another, denote

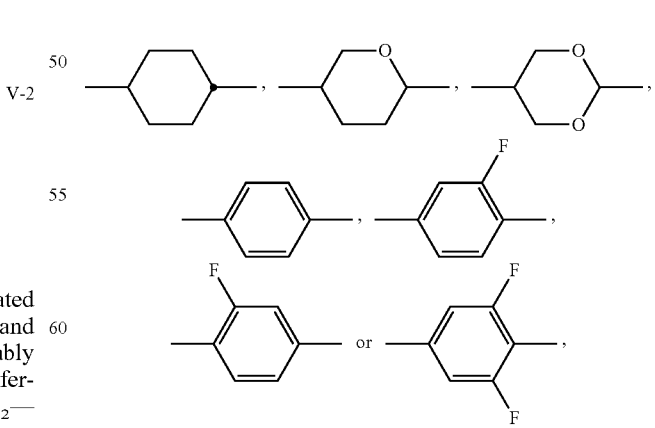

$L^{61}$ and $L^{62}$, independently of one another, denote H or F, preferably $L^{61}$ denotes F, and $X^6$ denotes halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^6$ denotes —CH$_2$CH$_2$—, —CF$_2$CF$_2$—, —COO—, trans-CH=CH—, trans-CF=CF—, —CH$_2$O— or —CF$_2$O—, preferably —CH$_2$CH$_2$—, —COO— or trans-CH=CH— and very preferably —COO— or trans-CH=CH—, and q denotes 0 or 1.

The media according to the present invention preferably comprise one or more compounds of the formula VI, preferably selected from the group of the compounds of the formulae VI-1 and VI-2:

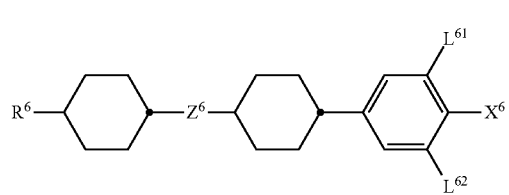

VI-1

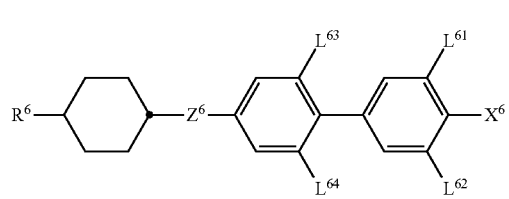

VI-2 in which the parameters have the respective meanings indicated above, and the parameters L$^{63}$ and L$^{64}$, independently of one another and of the other parameters, denote H or F, and Z$^6$ preferably denotes —CH$_2$—CH$_2$—.

The compounds of the formula VI-1 are preferably selected from the group of the compounds of the formulae VI-1a and VI-1b:

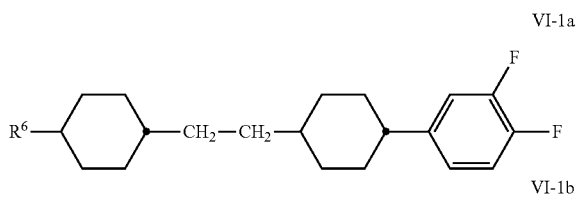

VI-1a

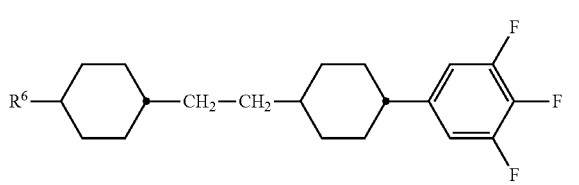

VI-1b in which R$^6$ has the meaning indicated above.

The compounds of the formula VI-2 are preferably selected from the group of the compounds of the formulae VI-2a to VI-2d:

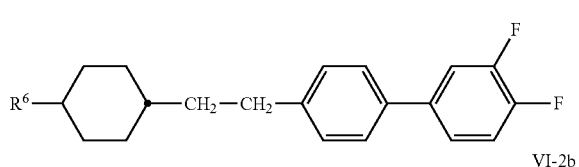

VI-2a

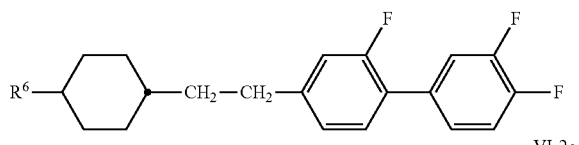

VI-2b

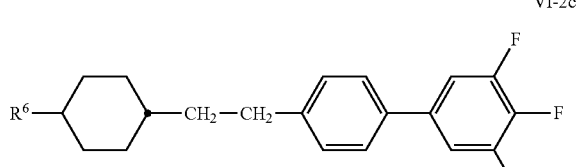

VI-2c

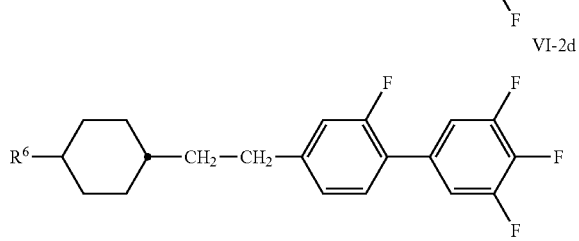

VI-2d in which R$^6$ has the meaning indicated above.

In addition, the liquid-crystal media according to the present invention may comprise one or more compounds of the formula VII

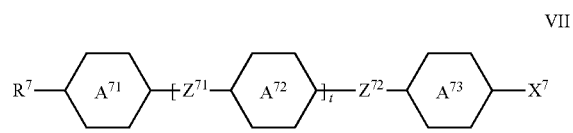

VII in which

R$^7$ has the meaning indicated for R$^2$ above under formula II, one of

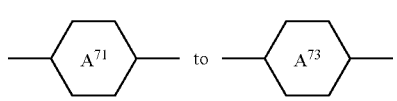

which is present denotes

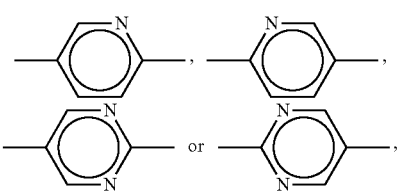

preferably

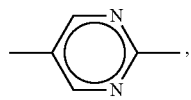

preferably

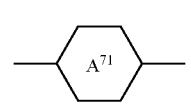

10 denotes

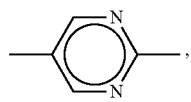

and the others have the same meaning or, independently of one another, denote

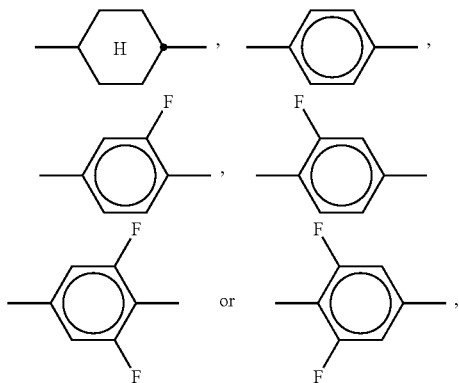

preferably

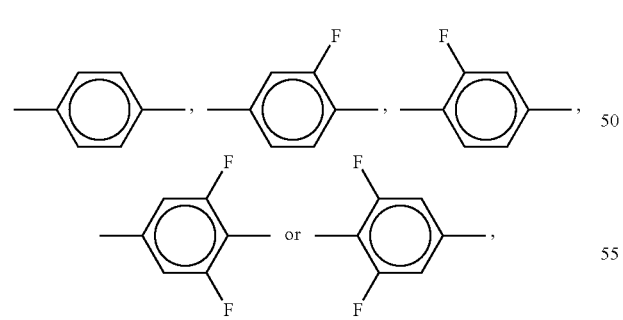

$Z^{71}$ and $Z^{72}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, t denotes 0, 1 or 2, preferably 0 or 1, more preferably 1, and $X^7$ has the meaning indicated for $X^2$ above under formula II or alternatively, independently of $R^7$, may have one of the meanings indicated for $R^7$.

The compounds of the formula VII are preferably dielectrically positive compounds.

In addition, the liquid-crystal media according to the present invention may comprise one or more compounds of the formula VIII

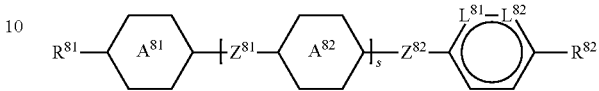

VIII in which $R^{81}$ and $R^{82}$, independently of one another, have the meaning indicated for $R^2$ above under formula II, and

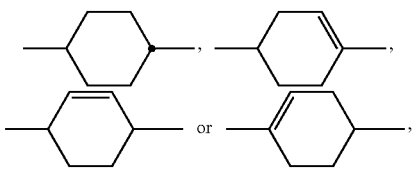

denotes

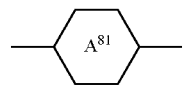

preferably

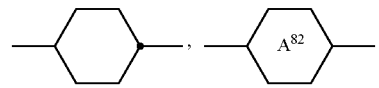

denotes

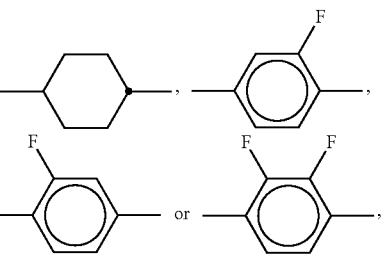

$Z^{81}$ and $Z^{82}$ independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, $L^{81}$ and $L^{82}$, independently of one another, denote C—F or N, preferably one of $L^{81}$ and $L^{82}$ or both denote(s) C—F and very preferably both denote C—F, and s denotes 0 or 1.

The compounds of the formula VIII are preferably dielectrically negative compounds.

The media according to the invention preferably comprise one or more compounds of the formula VIII, preferably selected from the group of the compounds of the formulae VIII-1 to VIII-3:

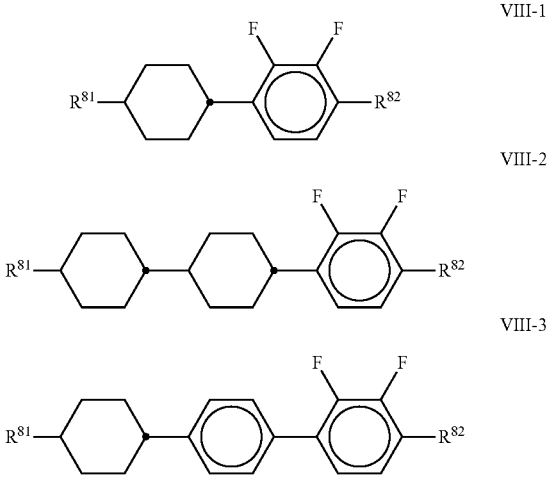

in which
R$^{81}$ and R$^{82}$ have the respective meanings indicated above under formula VIII.

In formulae VIII-1 to VIII-3, R$^{81}$ preferably denotes n-alkyl or 1-E-alkenyl and R$^{82}$ preferably denotes n-alkyl or alkoxy.

The liquid-crystalline media according to the present invention preferably comprise one or more compounds selected from the group of the compounds of the formulae I to VIII, preferably of the formulae I to VII and more preferably of the formulae I and II and/or III and/or IV and/or VI. They particularly preferably predominantly consist of, even more preferably essentially consist of and very preferably entirely consist of these compounds.

In this application, "comprise" in connection with compositions means that the relevant entity, i.e. the medium or the component, comprises the component or components or compound or compounds indicated, preferably in a total concentration of 10% or more and very preferably 20% or more.

In this connection, "predominantly consist of" means that the relevant entity comprises 55% or more, preferably 60% or more and very preferably 70% or more of the component or components or the compound or compounds indicated.

In this connection, "essentially consist of" means that the relevant entity comprises 80% or more, preferably 90% or more and very preferably 95% or more of the component or components or the compound or compounds indicated.

In this connection, "virtually completely consist of" or "entirely consist of" means that the relevant entity comprises 98% or more, preferably 99% or more and very preferably 100.0% of the component or components or the compound or compounds indicated.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 60° C. or more, more preferably 65° C. or more, particularly preferably 70° C. or more and very particularly preferably 75° C. or more.

The nematic phase of the media according to the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The Δ∈ of the liquid-crystal medium according to the invention, at 1 kHz and 20° C., is preferably 2 or more, more preferably 4 or more and very preferably 6 or more. In particular, Δ∈ is 20 or less.

The Δn of the liquid-crystal media according to the present invention, at 589 nm (Na$^D$) and 20° C., is preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a preferred embodiment of the present application, the Δn of the liquid-crystal media according to the present invention is preferably 0.080 or more, more preferably 0.090 or more.

In this preferred embodiment of the present invention, the Δn of the liquid-crystal media is preferably in the range from 0.090 or more to 0.120 or less, more preferably in the range from 0.095 or more to 0.115 or less and very particularly preferably in the range from 0.100 or more to 0.105 or less, while Δ∈ is preferably in the range from 5 or more to 11 or less, preferably in the range from 6 or more to 10 or less and particularly preferably in the range from 7 or more to 9 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 95° C. or more.

In accordance with the present invention, the compounds of the formula I together are preferably used in the media in a total concentration of 1% to 50%, more preferably 1% to 30%, even more preferably 2% to 30%, even more preferably 3% to 30% and very preferably 5% to 25% of the mixture as a whole.

The compounds selected from the group of the formulae II and III are preferably used in a total concentration of 2% to 60%, more preferably 3% to 35%, even more preferably 4% to 20% and very preferably 5% to 15% of the mixture as a whole.

The compounds of the formula IV are preferably used in a total concentration of 5% to 70%, more preferably 20% to 65%, even more preferably 30% to 60% and very preferably 40% to 55% of the mixture as a whole.

The compounds of the formula V are preferably used in a total concentration of 0% to 30%, more preferably 0% to 15% and very preferably 1% to 10% of the mixture as a whole.

The compounds of the formula VI are preferably used in a total concentration of 0% to 50%, more preferably 1% to 40%, even more preferably 5% to 30% and very preferably 10% to 20% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In a preferred embodiment, the concentration of the compound of the formula CC-3-V in the media according to the invention can be 50% to 65%, particularly preferably 55% to 60%.

The liquid-crystal media preferably comprise in total 50% to 100%, more preferably 70% to 100% and very preferably 80% to 100% and in particular 90% to 100% of the compounds of the formulae I to VII, preferably selected from the group of the compounds of the formulae I to VI, particularly preferably of the formulae I to V, in particular of the formulae I, II, III, IV, V and VII and very particularly preferably of the formulae I, II, III, IV and V. They preferably predominantly consist of and very preferably virtually completely consist of these compounds. In a preferred embodiment, the liquid-crystal media in each case comprise one or more compounds of each of these formulae.

In the present application, the expression dielectrically positive describes compounds or components where $\Delta\in>3.0$, dielectrically neutral describes those where $-1.5\leq\Delta\in\leq3.0$ and dielectrically negative describes those where $\Delta\in<-1.5$. $\Delta\in$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\in$ is defined as $(\in_{\|}-\in_{\perp})$, while $\in_{av.}$ is $(\in_{\|}+2\in_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany and are quoted for a temperature of 20° C., unless expressly stated otherwise. The optical anisotropy ($\Delta n$) is determined at a wavelength of 589.3 nm. The dielectric anisotropy ($\Delta\in$) is determined at a frequency of 1 kHz. The threshold voltages, as well as all other electro-optical properties, are determined using test cells produced at Merck KGaA, Germany. The test cells for the determination of $\Delta\in$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\in_{\|}$) and polyimide AL-1054 from Japan Synthetic Rubber, Japan, for homogeneous orientation ($\in_{\perp}$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of, the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| | | | |
|---|---|---|---|
| C |  | P | 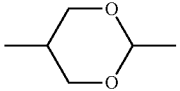 |
| D |  | DI | 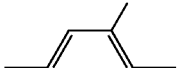 |
| A | 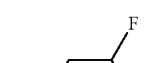 | AI | 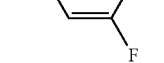 |
| G | 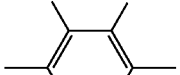 | GI | 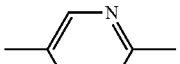 |
| U | 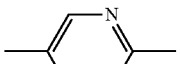 | UI | 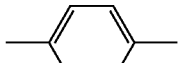 |
| Y | 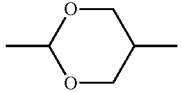 | | |
| M |  | MI | 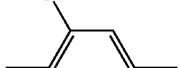 |
| N | 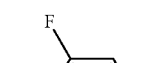 | NI |  |
| Np | 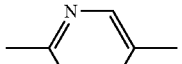 | dH | 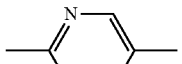 |

TABLE A-continued

Ring elements

| | | | |
|---|---|---|---|
| N3f | 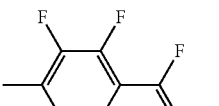 | N3fI | 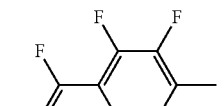 |
| tH | 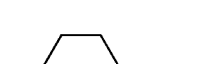 | tHI | 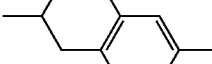 |
| tH2f | 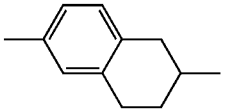 | tH2fI | 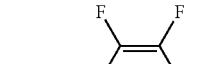 |
| K | 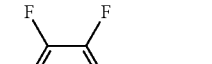 | KI | 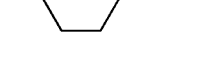 |
| L | 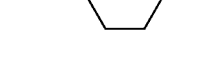 | LI | 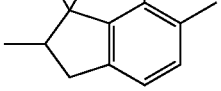 |
| F | 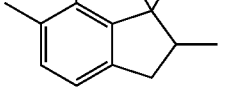 | FI | 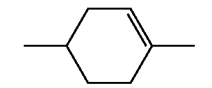 |

TABLE B

Linking groups

| | | | |
|---|---|---|---|
| E | —$CH_2CH_2$— | Z | —CO—O— |
| V | —CH=CH— | ZI | —O—CO— |
| X | —CF=CH— | O | —$CH_2$—O— |
| XI | —CH=CF— | OI | —O—$CH_2$— |
| B | —CF=CF— | Q | —$CF_2$—O— |
| T | —C≡C— | QI | —O—$CF_2$— |
| W | —$CF_2CF_2$— | T | —C≡C— |

TABLE C

End groups

| Left-hand side | | Right-hand side | |
|---|---|---|---|
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |

TABLE C-continued

| End groups | | | |
|---|---|---|---|
| Left-hand side | | Right-hand side | |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots "..." are spacers for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

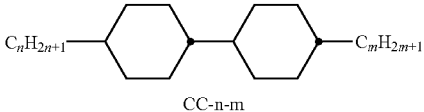

CC-n-m

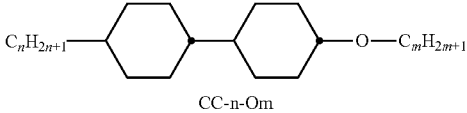

CC-n-Om

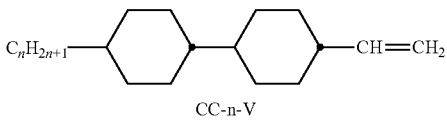

CC-n-V

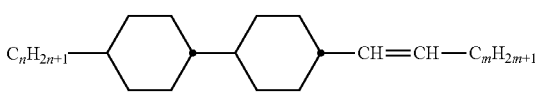

CC-n-Vm

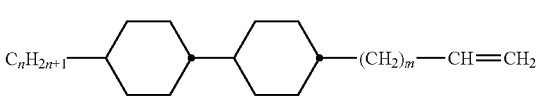

CC-n-mV

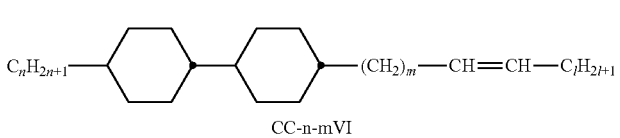

CC-n-mVl

TABLE D-continued
Illustrative structures
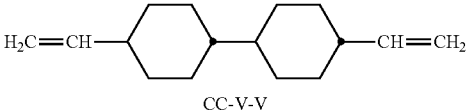
CC-V-V
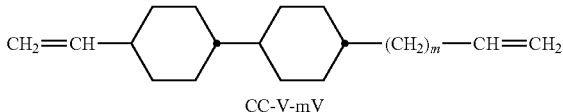
CC-V-mV
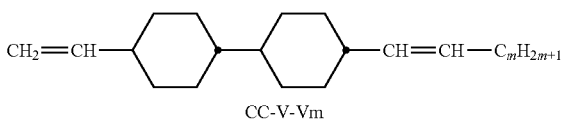
CC-V-Vm
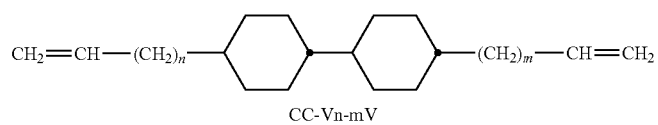
CC-Vn-mV
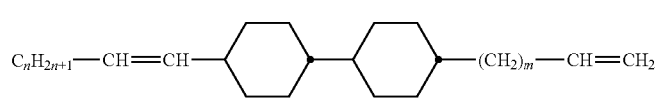
CC-nV-mV
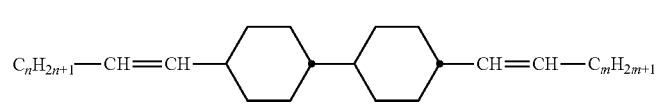
CC-nV-Vm
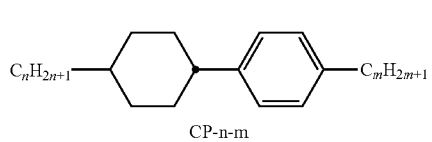
CP-n-m
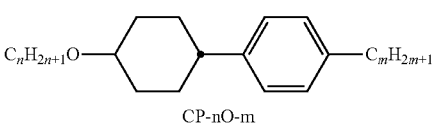
CP-nO-m
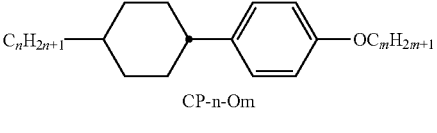
CP-n-Om
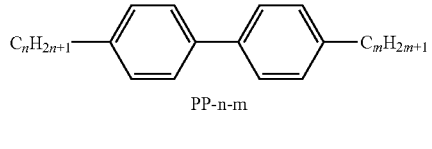
PP-n-m
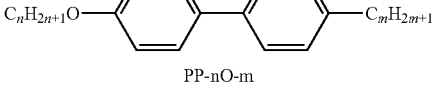
PP-nO-m TABLE D-continued Illustrative structures $C_nH_{2n+1}$—⬡—⬡—$OC_mH_{2m+1}$
PP-n-Om $C_nH_{2n+1}$—⬡—⬡—$CH=CH_2$
PP-n-V $C_nH_{2n+1}$—⬡—⬡—$CH=CH-C_mH_{2m+1}$
PP-n-Vm $C_nH_{2n+1}$—⬡—⬡—$(C_mH_{2m})-CH=CH_2$
PP-n-mV $C_nH_{2n+1}$—⬡—⬡—$(CH_2)_m-CH=CH-C_lH_{2l+1}$
PP-n-mVl $C_nH_{2n+1}$—⬢—⬢—⬡—$C_mH_{2m+1}$
CCP-n-m $C_nH_{2n+1}O$—⬢—⬢—⬡—$C_mH_{2m+1}$
CCP-nO-m $C_nH_{2n+1}$—⬢—⬢—⬡—$OC_mH_{2m+1}$
CCP-n-Om $C_nH_{2n+1}$—⬢—⬢—⬡—$CH=CH_2$
CCP-n-V $C_nH_{2n+1}$—⬢—⬢—⬡—$CH=CH-C_mH_{2m+1}$
CCP-n-Vm $C_nH_{2n+1}$—⬢—⬢—⬡—$(C_mH_{2m})-CH=CH_2$
CCP-n-mV TABLE D-continued Illustrative structures $C_nH_{2n+1}$—⬡—⬡—⌬—$(C_mH_{2m})$—CH=CH—$C_lH_{2l+1}$
CCP-n-mVI $H_2C$=CH—⬡—⬡—⌬—$C_mH_{2m+1}$
CCP-V-m $C_nH_{2n+1}$—CH=CH—⬡—⬡—⌬—$C_mH_{2m+1}$
CCP-nV-m $CH_2$=CH—$(CH_2)_n$—⬡—⬡—⌬—$C_mH_{2m+1}$
CCP-Vn-m $C_nH_{2n+1}$—CH=CH—$(CH_2)_m$—⬡—⬡—⌬—$C_lH_{2l+1}$
CCP-nVm-I $C_nH_{2n+1}$—⬡—⌬—⌬—$C_mH_{2m+1}$
CPP-n-m $C_nH_{2n+1}$—⬡—⌬—⌬(F)—$C_mH_{2m+1}$
CPG-n-m $C_nH_{2n+1}$—⬡—⌬(F)—⌬—$C_mH_{2m+1}$
CGP-n-m $C_nH_{2n+1}O$—⬡—⌬—⌬—$C_mH_{2m+1}$
CPP-nO-m $C_nH_{2n+1}$—⬡—⌬—⌬—$OC_mH_{2m+1}$
CPP-n-Om $H_2C$=CH—⬡—⌬—⌬—$C_mH_{2m+1}$
CPP-V-m TABLE D-continued Illustrative structures $C_nH_{2n+1}$—CH=CH—[cyclohexyl]—[phenyl]—[phenyl]—$C_mH_{2m+1}$
CPP-nV-m CH$_2$=CH—(C$_n$H$_{2n}$)—[cyclohexyl]—[phenyl]—[phenyl]—$C_mH_{2m+1}$
CPP-Vn-m $C_nH_{2n+1}$—CH=CH—(C$_m$H$_{2m}$)—[cyclohexyl]—[cyclohexyl]—[phenyl]—$C_lH_{2l+1}$
CPP-nVm-I $C_nH_{2n+1}$—[phenyl]—[phenyl(F)]—[phenyl]—$C_mH_{2m+1}$
PGP-n-m $C_nH_{2n+1}$—[phenyl]—[phenyl(F)]—[phenyl]—(CH$_2$)$_m$—CH=CH$_2$
PGP-n-mV $C_nH_{2n+1}$—[phenyl]—[phenyl(F)]—[phenyl]—(CH$_2$)$_m$—CH=CH—$C_lH_{2l+1}$
PGP-n-mVl $C_nH_{2n+1}$—[cyclohexyl]—[phenyl]—[phenyl]—[cyclohexyl]—$C_mH_{2m+1}$
CPPC-n-m $C_nH_{2n+1}$—[cyclohexyl]—[phenyl(F)]—[phenyl]—[cyclohexyl]—$C_mH_{2m+1}$
CGPC-n-m $C_nH_{2n+1}$—[cyclohexyl]—[cyclohexyl]—[phenyl]—[cyclohexyl]—$C_mH_{2m+1}$
CCPC-n-m $C_nH_{2n+1}$—[cyclohexyl]—[cyclohexyl]—CO—O—[phenyl]—[cyclohexyl]—$C_mH_{2m+1}$
CCZPC-n-m TABLE D-continued
Illustrative structures
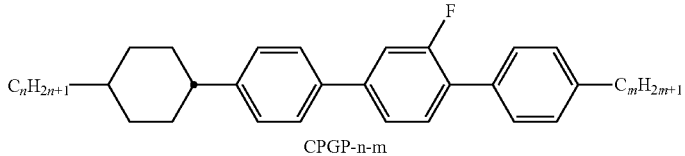
CPGP-n-m
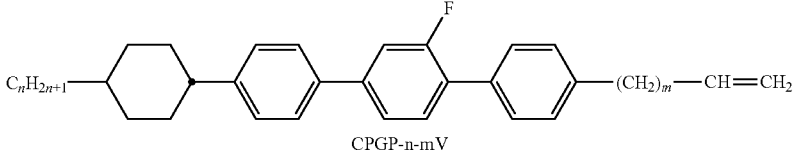
CPGP-n-mV
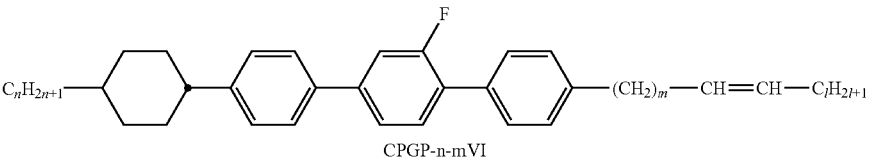
CPGP-n-mVI
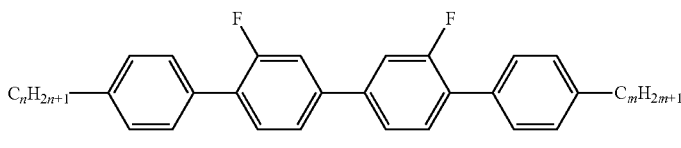
PGIGP-n-m
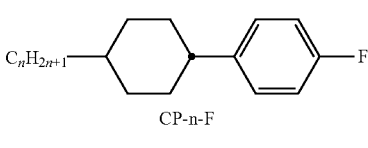
CP-n-F
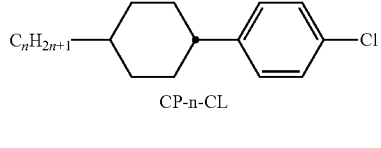
CP-n-CL
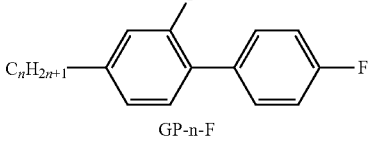
GP-n-F
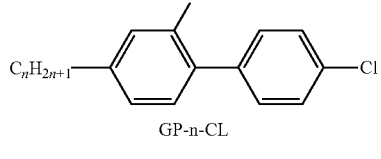
GP-n-CL
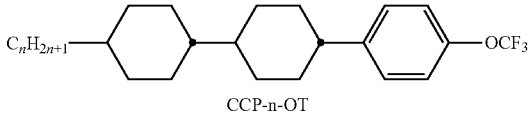
CCP-n-OT TABLE D-continued Illustrative structures CCG-n-OT CCG-n-F

CCG-V-F

CCG-V-F

CCU-n-F

CDU-n-F

CPG-n-F

CPU-n-F

TABLE D-continued
Illustrative structures
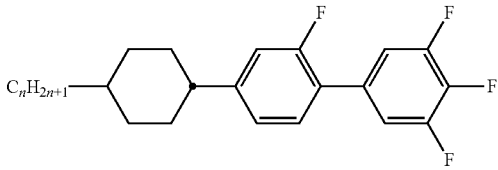
CGU-n-F
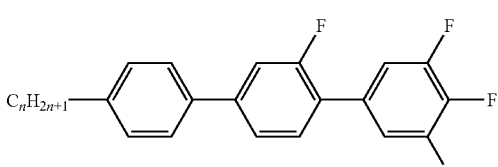
PGU-n-F
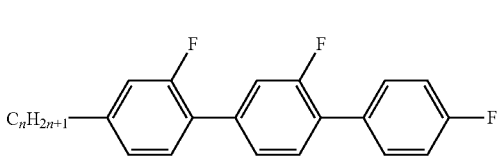
GGP-n-F
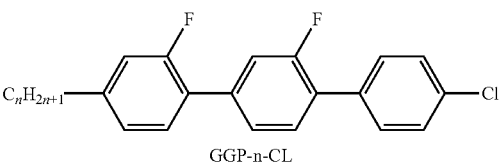
GGP-n-CL
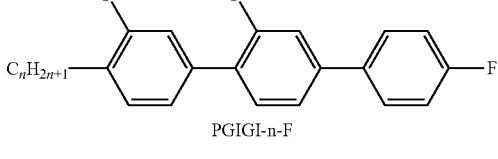
PGIGI-n-F
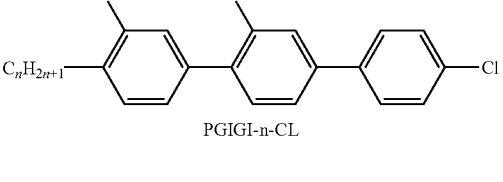
PGIGI-n-CL
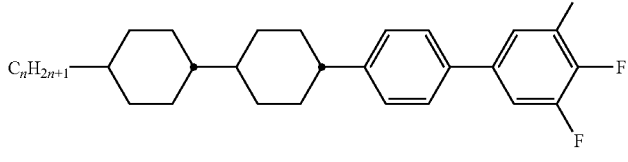
CCPU-n-F
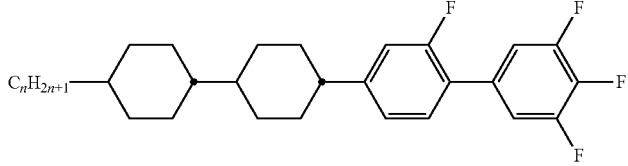
CCGU-n-F TABLE D-continued Illustrative structures CPGU-n-F PPGU-n-F CCZU-n-F CCQP-n-F CCQG-n-F CCQU-n-F PUQU-n-F CDUQU-n-F TABLE D-continued
Illustrative structures
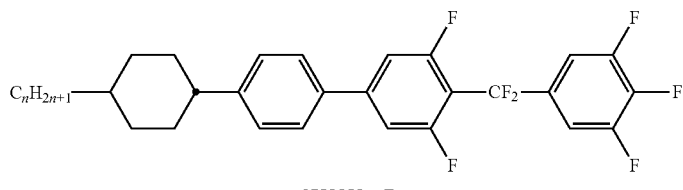
CPUQU-n-F
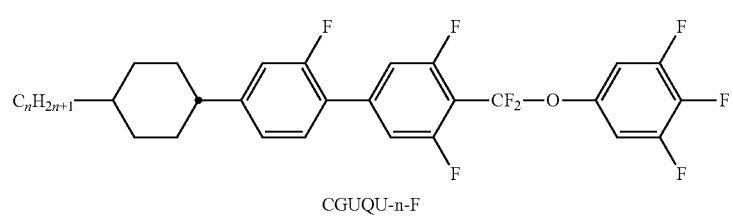
CGUQU-n-F
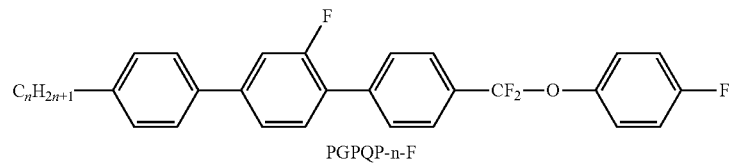
PGPQP-n-F
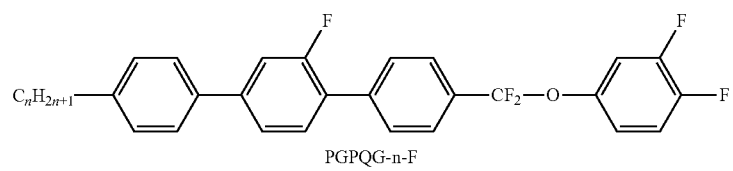
PGPQG-n-F
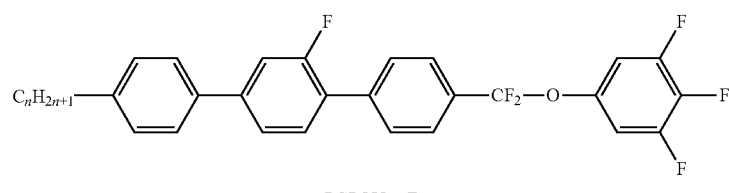
PGPQU-n-F
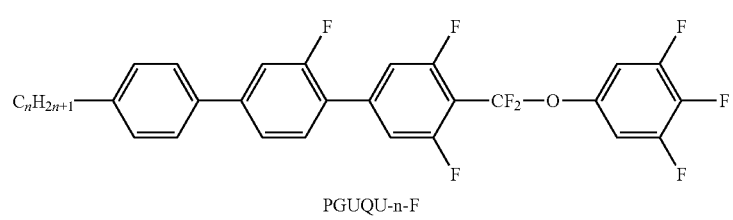
PGUQU-n-F
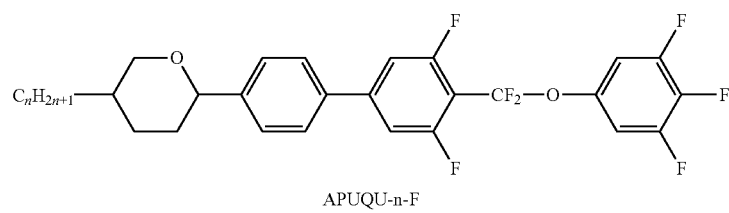
APUQU-n-F The following table, Table E, shows illustrative compounds which can be used as stabiliser in the mesogenic media according to the present invention.
TABLE E
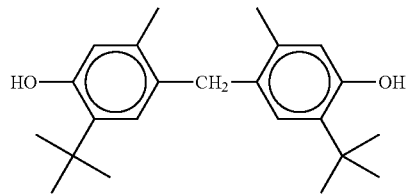
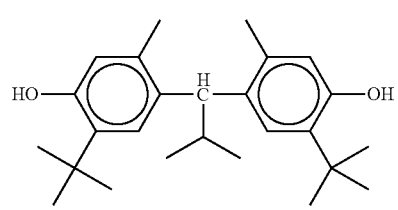
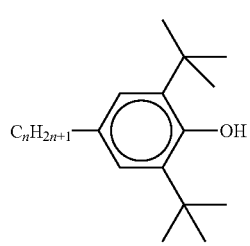
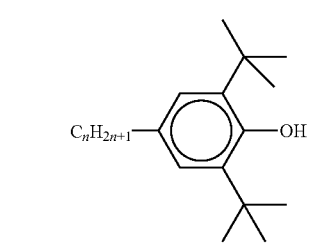
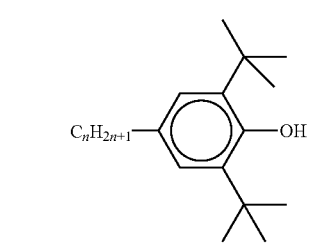
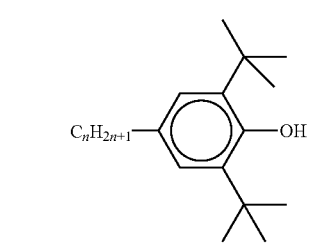
TABLE E-continued
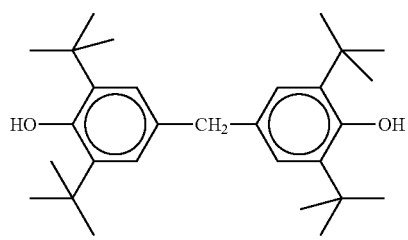
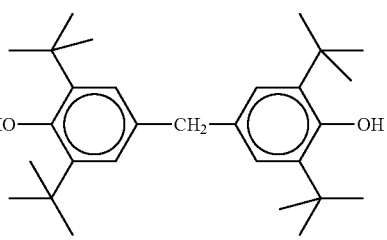
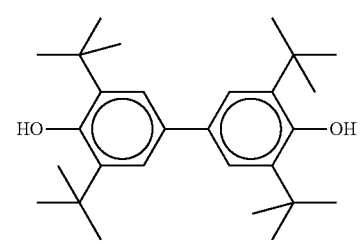
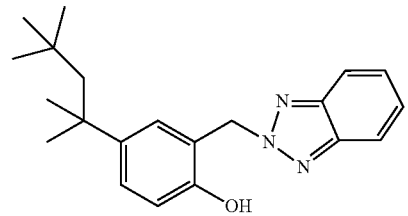
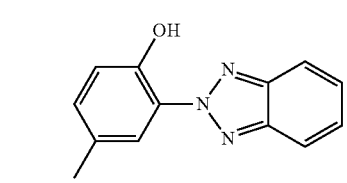
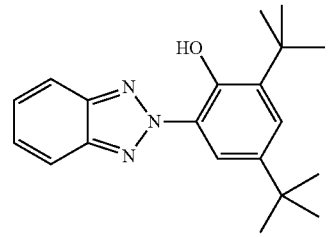
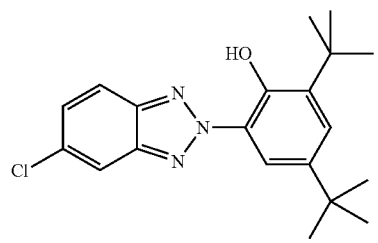

TABLE E-continued
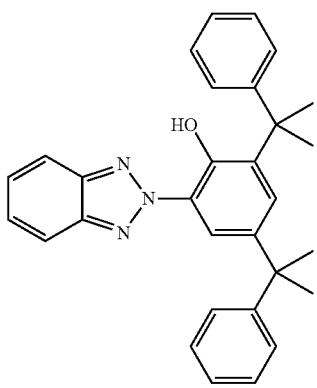
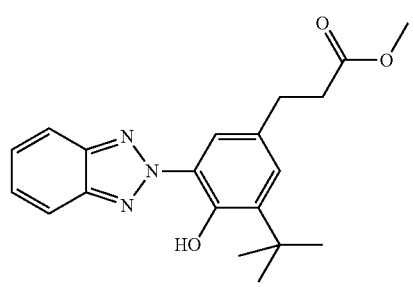
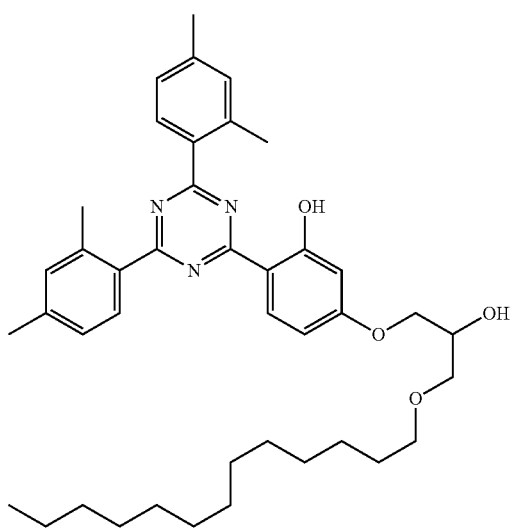
TABLE E-continued
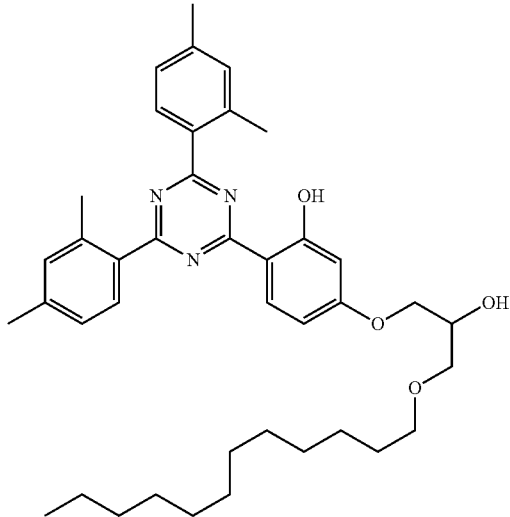
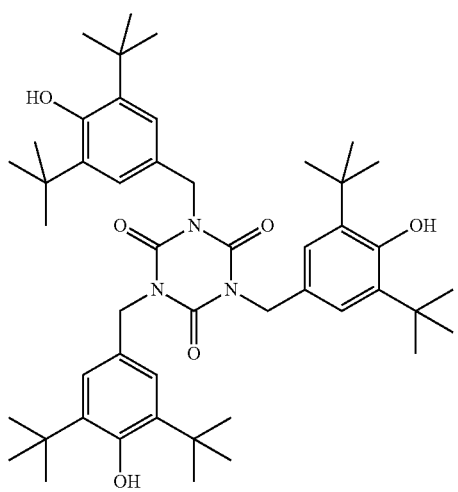
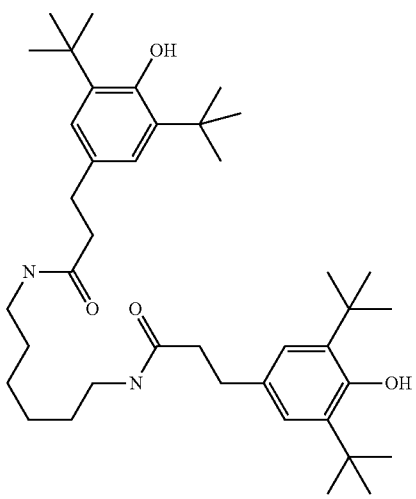

TABLE E-continued
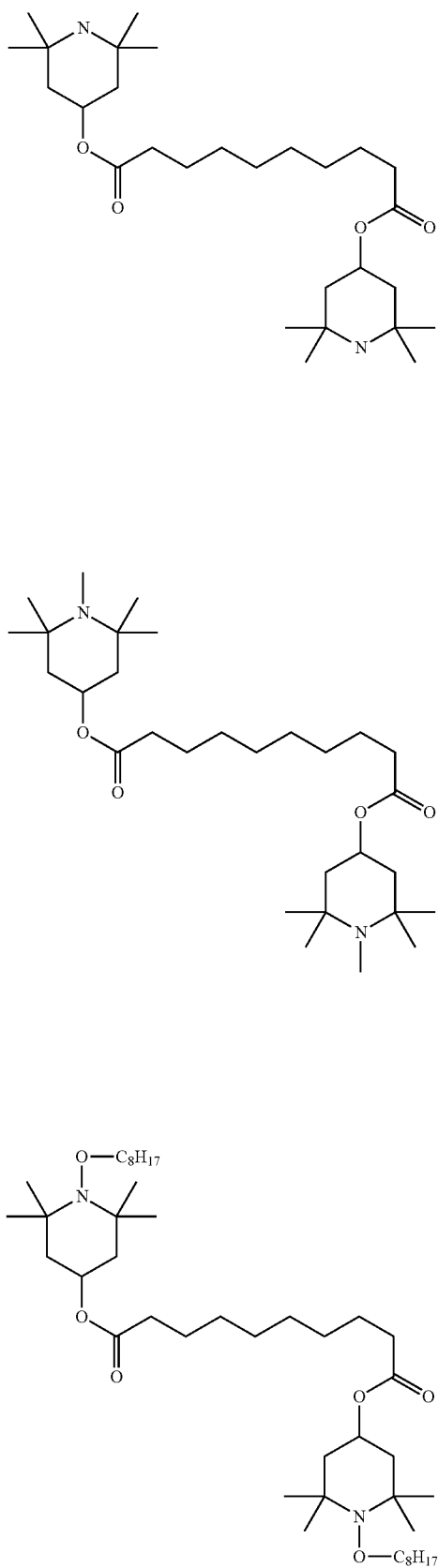
TABLE E-continued
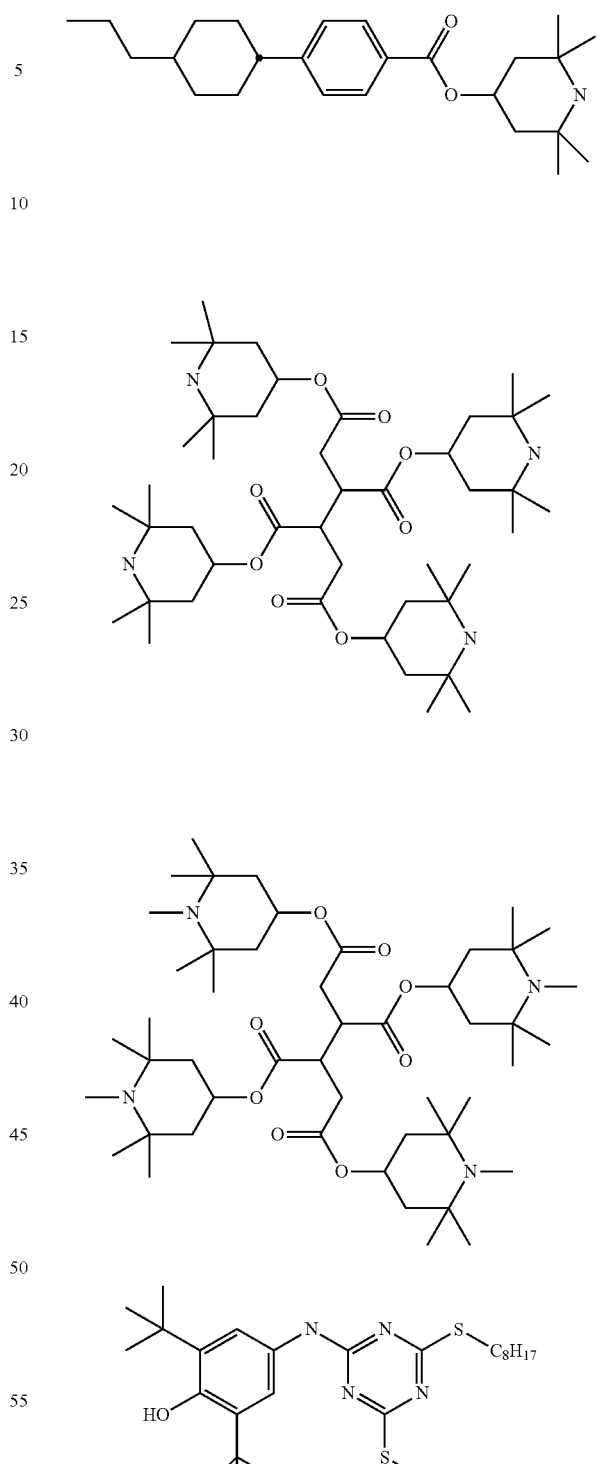
In a preferred embodiment of the present invention, the mesogenic media comprise one or more compounds selected from the group of the compounds from Table E.
The following table, Table F, shows illustrative compounds which can preferably be used as chiral dopants in the mesogenic media according to the present invention.

TABLE F
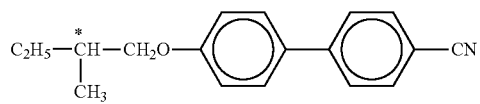
C 15
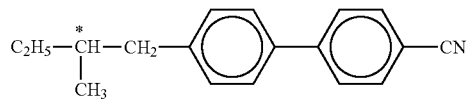
CB 15
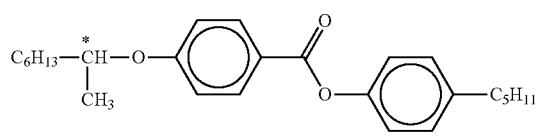
CM 21
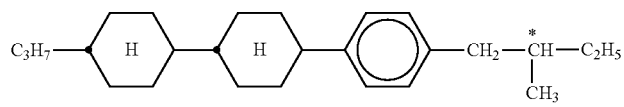
CM 44
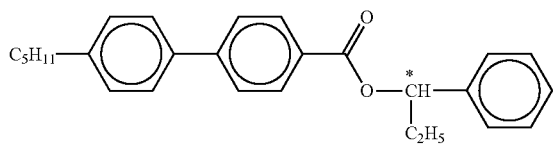
CM 45
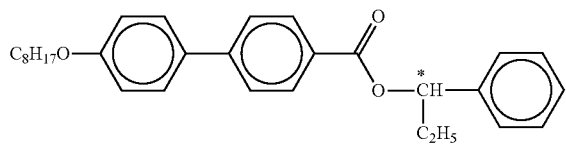
CM 47
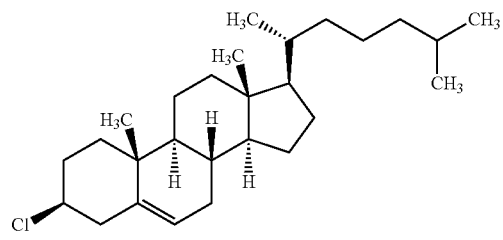
CC
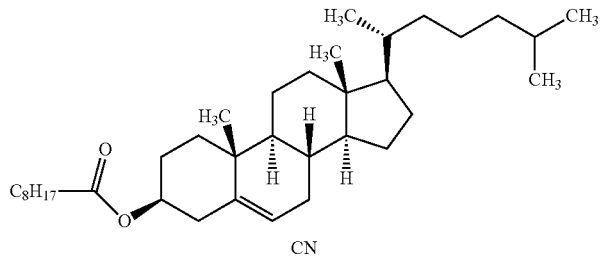
CN TABLE F-continued
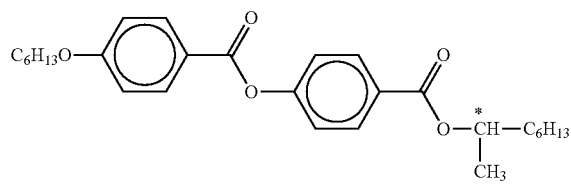
R/S-811
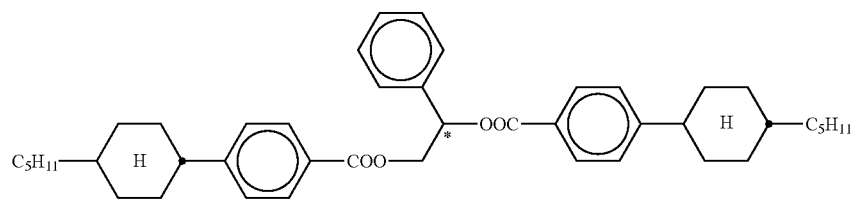
R/S-1011
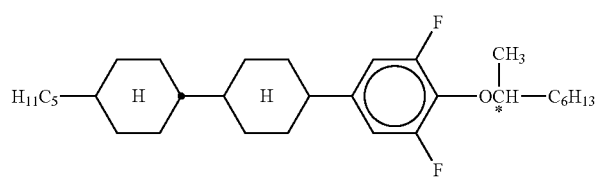
R/S-2011
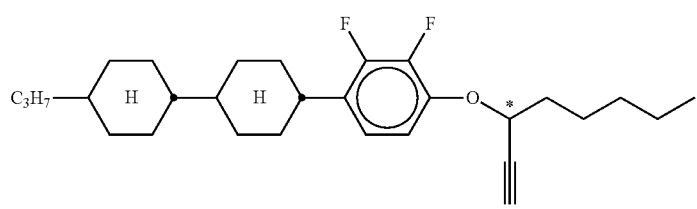
R/S-3011
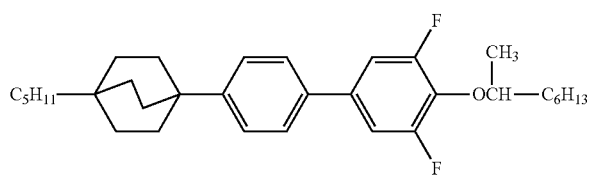
R/S-4011
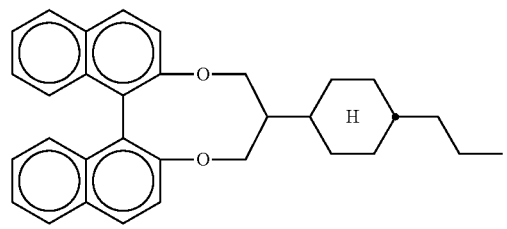
R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared.

Example 1

| Composition Compound | | |
|---|---|---|
| No. | Abbreviation | c/% |
| 1 | PGPQP-3-F | 6.0 |
| 2 | APUQU-2-F | 9.0 |
| 3 | APUQU-3-F | 8.0 |
| 4 | CDU-2-F | 5.0 |
| 5 | PGU-2-F | 9.0 |
| 6 | PGU-3-F | 3.0 |
| 7 | CC-3-V | 45.0 |
| 8 | CC-3-V1 | 6.0 |
| 9 | CCP-V-1 | 9.0 |
| Σ | | 100.0 |

| Physical properties | |
|---|---|
| $T(N, I)$ = | 74.0° C. |
| $n_e$ (20° C., 589.3 nm) = | 1.5860 |
| $\Delta n$ (20° C., 589.3 nm) = | 0.1010 |
| $\epsilon_{\parallel}$ (20° C., 1 kHz) = | 11.9 |
| $\Delta\epsilon$ (20° C., 1 kHz) = | 8.4 |
| $\gamma_1$ (20° C.) = | 58 mPa·s |
| $V_0$ (20° C.) = | 1.24 V |

Example 2

| Composition Compound | | |
|---|---|---|
| No. | Abbreviation | c/% |
| 1 | PGPQU-3-F | 6.0 |
| 2 | APUQU-2-F | 8.0 |
| 3 | APUQU-3-F | 7.0 |
| 4 | CDU-2-F | 4.5 |
| 5 | PGU-2-F | 9.0 |
| 6 | PGU-3-F | 3.0 |
| 7 | CC-3-V | 44.0 |
| 8 | CC-3-V1 | 6.5 |
| 9 | CCP-V-1 | 12.0 |
| Σ | | 100.0 |

| Physical properties | |
|---|---|
| $T(N, I)$ = | 74.0° C. |
| $n_e$ (20° C., 589.3 nm) = | 1.5852 |
| $\Delta n$ (20° C., 589.3 nm) = | 0.0999 |
| $\epsilon_{\parallel}$ (20° C., 1 kHz) = | 11.9 |
| $\Delta\epsilon$ (20° C., 1 kHz) = | 8.5 |
| $\gamma_1$ (20° C.) = | 57 mPa·s |
| $V_0$ (20° C.) = | 1.24 V |

Example 3

| Composition Compound | | |
|---|---|---|
| No. | Abbreviation | c/% |
| 1 | PGPQU-3-F | 6.0 |
| 2 | APUQU-2-F | 7.0 |
| 3 | APUQU-3-F | 6.0 |
| 4 | PGUQU-3-F | 7.5 |
| 5 | PGU-2-F | 7.0 |
| 6 | CC-3-V | 55.0 |
| 7 | CCP-V-1 | 11.5 |
| Σ | | 100.0 |

| Physical properties | |
|---|---|
| $T(N, I)$ = | 74.5° C. |
| $n_e$ (20° C., 589.3 nm) = | 1.5844 |
| $\Delta n$ (20° C., 589.3 nm) = | 0.0999 |
| $\epsilon_{\parallel}$ (20° C., 1 kHz) = | 11.2 |
| $\Delta\epsilon$ (20° C., 1 kHz) = | 8.0 |
| $\gamma_1$ (20° C.) = | 53 mPa·s |
| $V_0$ (20° C.) = | 1.27 V |

Example 4

| Composition Compound | | |
|---|---|---|
| No. | Abbreviation | c/% |
| 1 | PGPQU-3-F | 6.0 |
| 2 | APUQU-2-F | 9.0 |
| 3 | APUQU-3-F | 9.0 |
| 4 | PGUQU-3-F | 8.0 |
| 5 | CC-3-V | 59.0 |
| 6 | CCP-V-1 | 3.0 |
| 7 | PGP-2-3 | 2.0 |
| 8 | PGP-2-4 | 4.0 |
| Σ | | 100.0 |

| Physical properties | |
|---|---|
| $T(N, I)$ = | 73.0° C. |
| $n_e$ (20° C., 589.3 nm) = | 1.5850 |
| $\Delta n$ (20° C., 589.3 nm) = | 0.1017 |

-continued

| | |
|---|---|
| $\epsilon_\parallel$ (20° C., 1 kHz) = | 11.4 |
| $\Delta\epsilon$ (20° C., 1 kHz) = | 8.2 |
| $\gamma_1$ (20° C.) = | 53 mPa·s |

These mixtures of Examples 1 to 4 are very highly suitable for displays in IPS mode.

Example 5

| Composition Compound | | |
|---|---|---|
| No. | Abbreviation | c/% |
| 1 | PGPQP-3-F | 4.0 |
| 2 | PGUQU-3-F | 9.0 |
| 3 | PGU-3-F | 10.0 |
| 4 | CC-3-V | 39.0 |
| 5 | CC-3-V1 | 8.0 |
| 6 | CCP-V-1 | 4.0 |
| 7 | PP-1-2V1 | 7.0 |
| 8 | PGP-2-3 | 6.0 |
| 9 | PGP-2-4 | 6.0 |
| 10 | PGP-2-5 | 7.0 |
| Σ | | 100.0 |

| Physical properties | |
|---|---|
| T(N, I) = | 75.0° C. |
| $n_e$ (20° C., 589.3 nm) = | 1.6325 |
| $\Delta n$ (20° C., 589.3 nm) = | 0.1368 |
| $\epsilon_\parallel$ (20° C., 1 kHz) = | 7.6 |
| $\Delta\epsilon$ (20° C., 1 kHz) = | 4.7 |
| $\gamma_1$ (20° C.) = | 58 mPa·s |
| $V_{10}$ (20° C.) = | 2.04 V |
| $V_{90}$ (20° C.) = | 2.96 V |

Example 6

| Composition Compound | | |
|---|---|---|
| No. | Abbreviation | c/% |
| 1 | PGPQU-3-F | 5.0 |
| 2 | PGUQU-3-F | 7.0 |
| 3 | PGU-3-F | 10.0 |
| 4 | CC-3-V | 38.0 |
| 5 | CC-3-V1 | 8.0 |
| 6 | CCP-V-1 | 6.0 |
| 7 | PP-1-2V1 | 8.0 |
| 8 | PGP-2-3 | 6.0 |
| 9 | PGP-2-4 | 6.0 |
| 10 | PGP-2-5 | 6.0 |
| Σ | | 100.0 |

| Physical properties | |
|---|---|
| T(N, I) = | 74.0° C. |
| $n_e$ (20° C., 589.3 nm) = | 1.6308 |
| $\Delta n$ (20° C., 589.3 nm) = | 0.1352 |
| $\epsilon_\parallel$ (20° C., 1 kHz) = | 7.7 |
| $\Delta\epsilon$ (20° C., 1 kHz) = | 4.7 |
| $\gamma_1$ (20° C.) = | 57 mPa·s |
| $V_{10}$ (20° C.) = | 2.02 V |
| $V_{90}$ (20° C.) = | 2.95 V |

Example 7

| Composition Compound | | |
|---|---|---|
| No. | Abbreviation | c/% |
| 1 | PGPQU-3-F | 6.0 |
| 2 | PGUQU-3-F | 6.5 |
| 3 | PGU-3-F | 10.0 |
| 4 | CC-3-V | 38.5 |
| 5 | CC-3-V1 | 8.0 |
| 6 | CCP-V-1 | 5.0 |
| 7 | PP-1-2V1 | 7.5 |
| 8 | PGP-2-3 | 6.0 |
| 9 | PGP-2-4 | 6.0 |
| 10 | PGP-2-5 | 6.5 |
| Σ | | 100.0 |

| Physical properties | |
|---|---|
| T(N, I) = | 74.0° C. |
| $n_e$ (20° C., 589.3 nm) = | 1.6311 |
| $\Delta n$ (20° C., 589.3 nm) = | 0.1357 |
| $\epsilon_\parallel$ (20° C., 1 kHz) = | 7.8 |
| $\Delta\epsilon$ (20° C., 1 kHz) = | 4.8 |
| $\gamma_1$ (20° C.) = | 58 mPa·s |
| $V_{10}$ (20° C.) = | 2.00 V |
| $V_{90}$ (20° C.) = | 2.95 V |

Example 8

| Composition Compound | | |
|---|---|---|
| No. | Abbreviation | c/% |
| 1 | PGPQU-3-F | 5.0 |
| 2 | PGUQU-3-F | 8.0 |
| 3 | PGU-2-F | 4.0 |
| 4 | PGU-3-F | 11.0 |
| 5 | PUQU-3-F | 10.0 |
| 6 | CC-3-V | 32.0 |
| 7 | CC-3-V1 | 8.0 |
| 8 | CCP-V-1 | 15.0 |
| 9 | PGP-2-3 | 4.0 |
| 10 | PGP-2-4 | 3.0 |
| Σ | | 100.0 |

| Physical properties | |
|---|---|
| T(N, I) = | 74.5° C. |
| $n_e$ (20° C., 589.3 nm) = | 1.6188 |
| $\Delta n$ (20° C., 589.3 nm) = | 0.1264 |
| $\epsilon_\parallel$ (20° C., 1 kHz) = | 12.6 |
| $\Delta\epsilon$ (20° C., 1 kHz) = | 9.2 |
| $\gamma_1$ (20° C.) = | 65 mPa·s |
| $V_{10}$ (20° C.) = | 1.40 V |
| $V_{90}$ (20° C.) = | 2.12 V |

The mixtures of Examples 5 to 8 are very highly suitable for displays in TN mode. The mixtures of Examples 5 to 7 are particularly suitable for displays having 5 to 6 volt drivers, and the mixture of Example 8 is particularly suitable for displays having 2.5 to 3 volt drivers.

The invention claimed is:
1. A liquid-crystalline medium, comprising:
one or more compounds of formula I

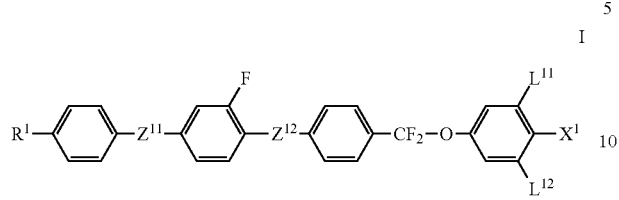

wherein
R$^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,
Z$^{11}$ and Z$^{12}$, independently of one another, denote —CH$_2$CH$_2$—, —CF$_2$CF$_2$—, —COO—, trans-CH═CH—, trans-CF═CF—, —CH$_2$O—, —CF$_2$O— or a single bond,
L$^{11}$ and L$^{12}$, independently of one another, denote H, F or Cl, and
X$^1$ denotes F, Cl, —CFH$_2$, —CF$_2$H, —CF$_3$, —OCF$_2$H or —OCF$_3$.

2. The liquid-crystalline medium according to claim 1, further comprising one or more compounds selected from formulae II and III:

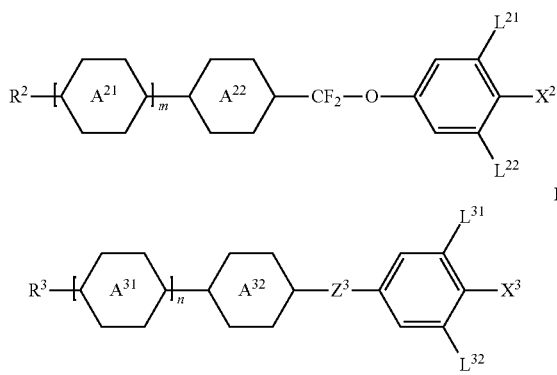

wherein
R$^2$ and R$^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

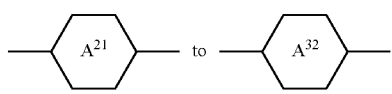

on each appearance, independently of one another, denote

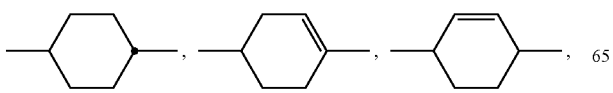

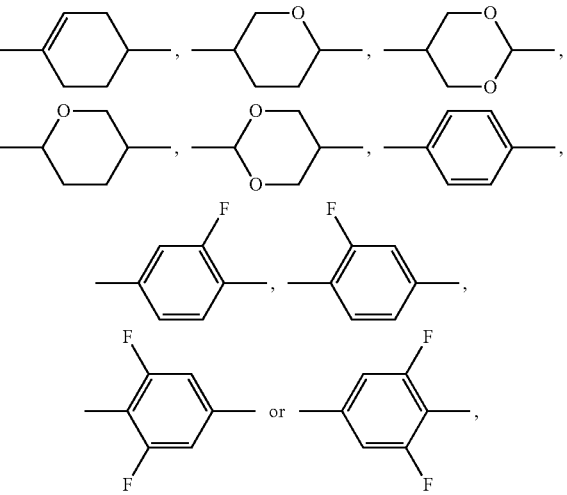

L$^{21}$, L$^{22}$, L$^{31}$ and L$^{32}$, independently of one another, denote H or F,
X$^2$ and X$^3$, independently of one another, denote halogen, halogenated alkyl or alkoxy having 1 to 3 C atoms or halogenated alkenyl or alkenyloxy having 2 or 3 C atoms,
Z$^3$ denotes —CH$_2$CH$_2$—, —CF$_2$CF$_2$—, —COO—, trans-CH═CH—, trans-CF═CF—, —CH$_2$O— or a single bond, and
m and n, independently of one another, denote 0, 1, 2 or 3,
wherein the compounds of formula I are excluded from the compounds of formula II.

3. The liquid-crystalline medium according to claim 1, further comprising one or more compounds of formula IV

in which
R$^{41}$ and R$^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

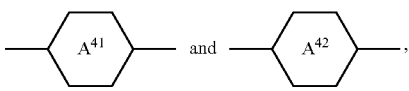

independently of one another and, if

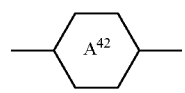

occurs twice, also these independently of one another, denote

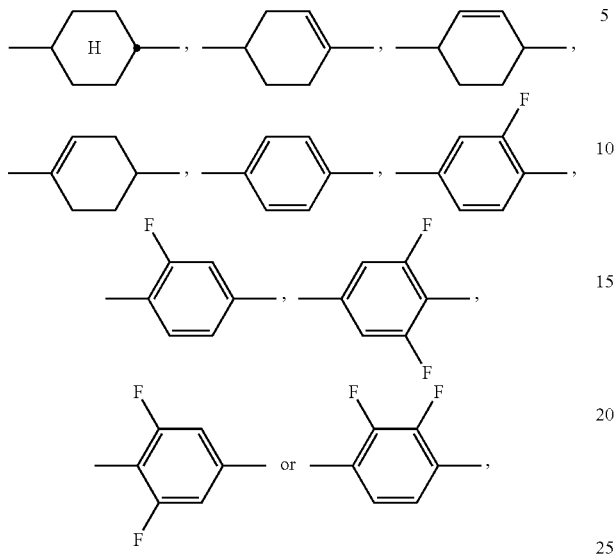

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. The liquid-crystalline medium according to claim 1, wherein the total concentration of the compounds of the formula I in the medium is in the range from 1% to 50%.

5. The liquid-crystalline medium according to claim 2, wherein said medium comprises one or more compounds of the formula II.

6. The liquid-crystalline medium according to claim 2, wherein said medium comprises one or more compounds of the formula III.

7. The liquid-crystalline medium according to claim 1, further comprising one or more dielectrically neutral compounds of formula V

V

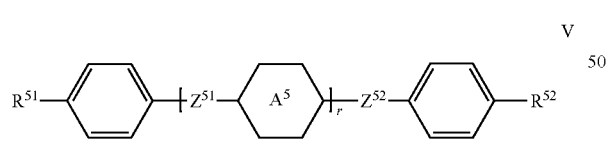

wherein $R^{51}$ and $R^{52}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

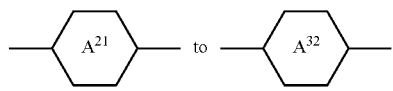

on each appearance, independently of one another, denote

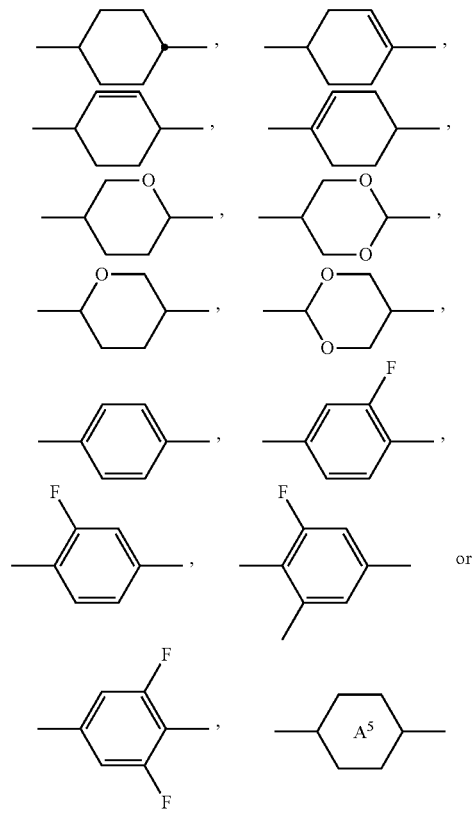

on each occurrence, independently of one another, denotes

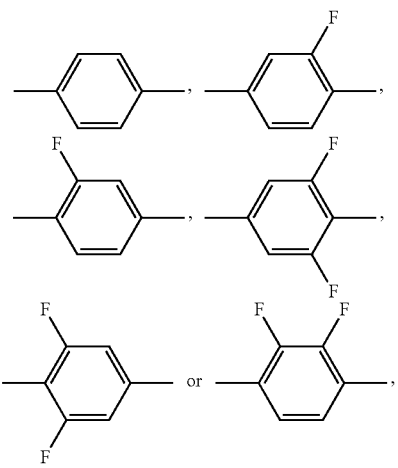

$Z^{51}$ and $Z^{52}$, independently of one another and, if $Z^{61}$ occurs twice, also these independently of one another, denote —CH$_2$CH$_2$—, —COO—, trans-CH=CH—, trans-CF=CF—, —CH$_2$O—, —CF$_2$O— or a single bond, and r denotes 0, 1 or 2.

8. A liquid-crystal display containing a medium according to claim 1.

9. The liquid-crystal display according to claim 8, wherein said display is addressed by an active matrix.

10. A method of generating an electro-optical effect comprising subjecting the liquid-crystal display according to claim 8 to an electric field.

11. A process for the preparation of a medium according to claim 2, said process comprising:

mixing one or more compounds of the formula I with one or more of the compounds of formula II and/or formula III, and/or one or more further liquid-crystalline compounds, and/or one or more additives.

12. The liquid-crystalline medium according to claim 1, wherein $X^1$ is F.

13. The liquid-crystalline medium according to claim 12, wherein $L^{11}$ and $L^{12}$ are both H.

14. The liquid-crystalline medium according to claim 12, wherein $L^{11}$ and $L^{12}$ are both F.

15. The liquid-crystalline medium according to claim 2, wherein the compounds of the formulae I, II and III have a dielectric anisotropy of greater than 3.

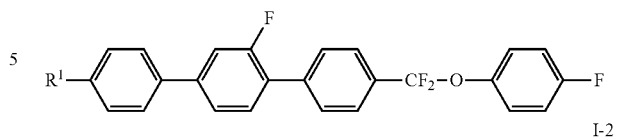

I-1

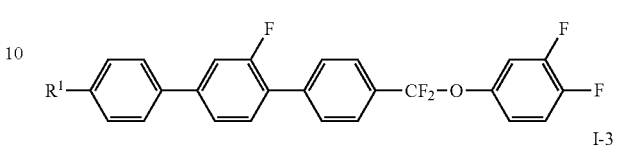

I-2

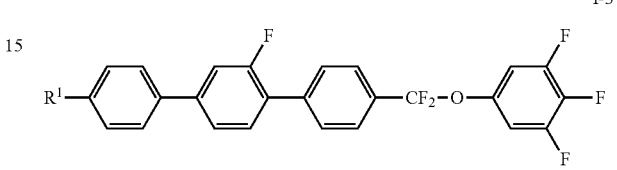

I-3 in which $R^1$ has the meaning indicated in claim 1.

19. The liquid-crystalline medium according to claim 2, wherein the compounds of formula II are selected from formulae II-1 to II-4:

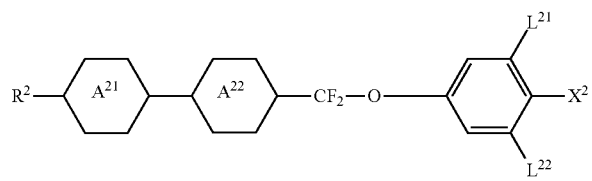

II-1

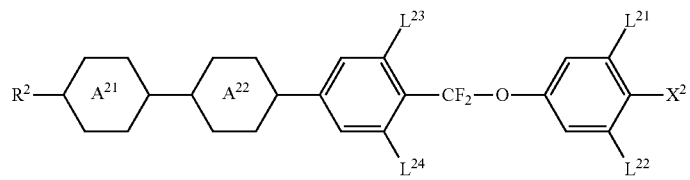

II-2

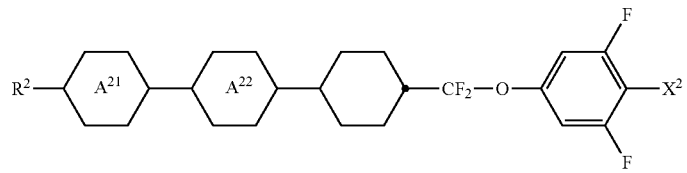

II-3

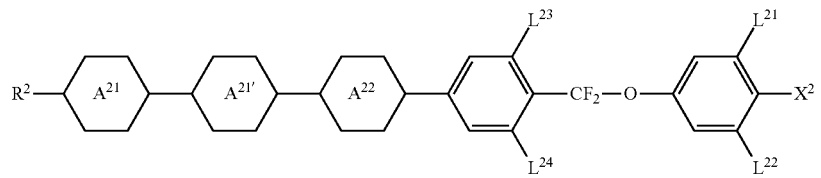

II-4

16. The liquid-crystalline medium according to claim 7, wherein the compounds of the formula V have a dielectric anisotropy in the range from −1.5 to 3.

17. The liquid-crystalline medium according to claim 1, wherein said liquid-crystalline medium contains in total 1 to 50% of compounds of the formula I.

18. The liquid-crystalline medium according to claim 1, wherein the compounds of formula I are selected from formulae I-1 to I-3:

wherein $L^{23}$ and $L^{24}$, independently of one another, denote H or F, and

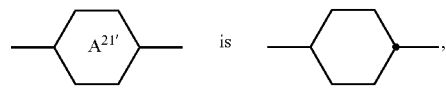

-continued
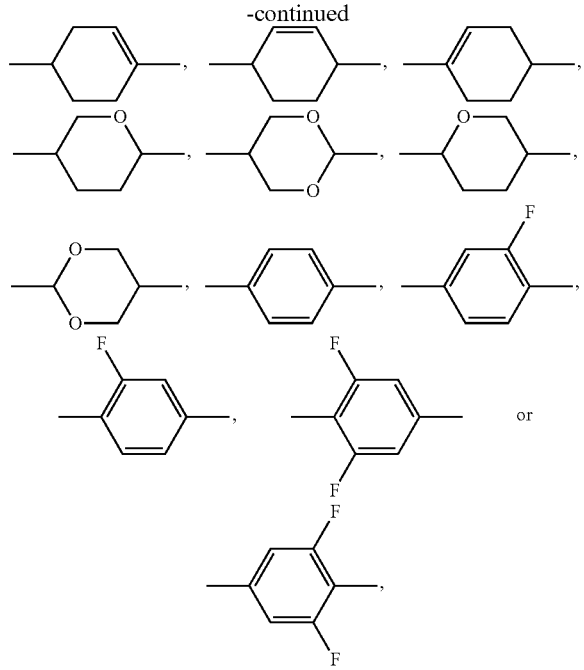
and/or the compounds of formula III are selected from formulae III-1 and III-2:
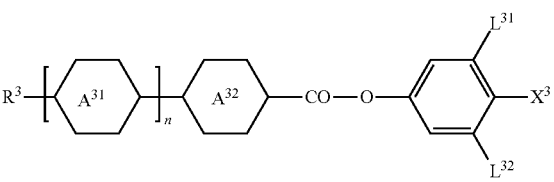
III-1
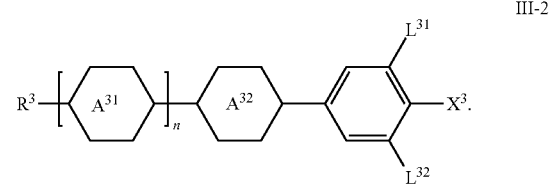
III-2
* * * * *